United States Patent
Kessler et al.

(10) Patent No.: US 11,706,848 B2
(45) Date of Patent: Jul. 18, 2023

(54) MULTIFUNCTIONAL ASSEMBLIES

(71) Applicant: Metis Design Corporation, Boston, MA (US)

(72) Inventors: Seth S. Kessler, Newton, MA (US); Gregory A. Thomas, San Francisco, CA (US); Christopher T. Dunn, Salem, MA (US); Michael Borgen, Wilmington, MA (US); Brian L. Wardle, Lexington, MA (US)

(73) Assignee: Metis Design Corporation, Boston, MA (US)

( * ) Notice: Subject to any disclaimer, the term of this patent is extended or adjusted under 35 U.S.C. 154(b) by 3 days.

(21) Appl. No.: 17/576,019

(22) Filed: Jan. 14, 2022

(65) Prior Publication Data

US 2022/0191978 A1    Jun. 16, 2022

Related U.S. Application Data

(63) Continuation of application No. 14/678,066, filed on Apr. 3, 2015.
(Continued)

(51) Int. Cl.
*H05B 6/10* (2006.01)
*H05B 3/26* (2006.01)
(Continued)

(52) U.S. Cl.
CPC ............... *H05B 6/101* (2013.01); *H01B 1/04* (2013.01); *H01C 13/00* (2013.01); *H01G 4/33* (2013.01);
(Continued)

(58) Field of Classification Search
CPC ...... H05B 6/101; H05B 1/0236; H05B 3/145; H05B 3/20; H05B 3/265; H05B 3/267;
(Continued)

(56) References Cited

U.S. PATENT DOCUMENTS

| 2,884,786 A | 5/1959 | Burk |
| 3,594,775 A | 7/1971 | Fox |

(Continued)

FOREIGN PATENT DOCUMENTS

| EP | 1845018 A2 | 10/2007 |
| EP | 2658777 A2 | 11/2013 |

(Continued)

OTHER PUBLICATIONS

Ahmed et al., Heat Emitting Layers as an aid for enhancing NDE of aircraft composite structures. 49th AIAA/ASME/ASCE/AHS/ASC Structures, Structural Dynamics and Materials Conference. Apr. 7-10, 2008;vol. 2081-2089.

(Continued)

*Primary Examiner* — Dana Ross
*Assistant Examiner* — Joe E Mills, Jr.
(74) *Attorney, Agent, or Firm* — McCarter & English, LLP; David R. Burns

(57) ABSTRACT

A multifunctional assembly having a resistive element a conductive element in electrical communication with the resistive element, the conductive element defining at least one of a plurality of multifunctional zones of the resistive element, wherein the conductive element is configured to direct a flow of electricity across at least one of the plurality of multifunctional zones of the resistive element in a preselected manner.

14 Claims, 10 Drawing Sheets

Related U.S. Application Data

(60) Provisional application No. 62/057,728, filed on Sep. 30, 2014, provisional application No. 61/978,152, filed on Apr. 10, 2014, provisional application No. 61/978,154, filed on Apr. 10, 2014.

(51) Int. Cl.
| | | |
|---|---|---|
| H01B 1/04 | (2006.01) | |
| H01C 13/00 | (2006.01) | |
| H01G 4/33 | (2006.01) | |
| H05B 1/02 | (2006.01) | |
| H05B 3/14 | (2006.01) | |
| H05B 3/20 | (2006.01) | |

(52) U.S. Cl.
CPC ........... *H05B 1/0236* (2013.01); *H05B 3/145* (2013.01); *H05B 3/20* (2013.01); *H05B 3/265* (2013.01); *H05B 3/267* (2013.01); *H05B 2203/011* (2013.01); *H05B 2203/013* (2013.01); *H05B 2203/016* (2013.01); *H05B 2203/017* (2013.01); *H05B 2214/02* (2013.01); *H05B 2214/04* (2013.01)

(58) Field of Classification Search
CPC ........ H05B 2203/011; H05B 2203/013; H05B 2203/016; H05B 2203/017; H05B 2214/02; H05B 2214/04; H01B 1/04; H01C 13/00; H01G 4/33
See application file for complete search history.

(56) References Cited

U.S. PATENT DOCUMENTS

| | | | |
|---|---|---|---|
| 3,789,190 | A | 1/1974 | Orosy et al. |
| 4,170,677 | A | 10/1979 | Hutcheson |
| 4,277,671 | A | 7/1981 | Mori et al. |
| 4,549,073 | A | 10/1985 | Tamura et al. |
| 4,868,899 | A | 9/1989 | Bard et al. |
| 5,698,316 | A | 12/1997 | Kuras et al. |
| 6,180,925 | B1 | 1/2001 | Moore et al. |
| 6,194,685 | B1 | 2/2001 | Rutherford |
| 6,236,025 | B1 | 5/2001 | Berkcan et al. |
| 6,276,214 | B1 | 8/2001 | Kimura et al. |
| 6,512,444 | B1 | 1/2003 | Morris, Jr. et al. |
| 6,514,453 | B2 | 2/2003 | Vigliotti et al. |
| 6,882,051 | B2 | 4/2005 | Majumdar et al. |
| 6,924,335 | B2 | 8/2005 | Fan et al. |
| 6,986,853 | B2 | 1/2006 | Glatkowski et al. |
| 7,057,881 | B2 | 6/2006 | Chow et al. |
| 7,106,310 | B2 | 9/2006 | Knowles et al. |
| 7,217,374 | B2 | 5/2007 | Watanabe et al. |
| 7,439,877 | B1 | 10/2008 | Jarvinen |
| 7,537,825 | B1 | 5/2009 | Wardle et al. |
| 7,659,493 | B2 | 2/2010 | Reusche et al. |
| 7,673,521 | B2 | 3/2010 | Ajayan et al. |
| 7,772,648 | B1 | 8/2010 | Ivanov et al. |
| 7,786,736 | B2 | 8/2010 | Thostenson et al. |
| 7,968,824 | B2 | 6/2011 | Lee et al. |
| 8,146,861 | B2 | 4/2012 | Lengsfeld et al. |
| 8,257,678 | B2 | 9/2012 | Steiner, III et al. |
| 8,283,612 | B2 | 10/2012 | Keite-Telgenbuescher et al. |
| 8,303,792 | B1 | 11/2012 | Schreiber et al. |
| 8,337,979 | B2 | 12/2012 | Wardle et al. |
| 8,525,507 | B2 | 9/2013 | Aldraihem |
| 8,684,595 | B2 | 4/2014 | Wardle et al. |
| 8,931,740 | B2 | 1/2015 | Nordin et al. |
| 9,091,657 | B2 | 7/2015 | Kessler et al. |
| 9,839,073 | B2 | 12/2017 | Kessler et al. |
| 2003/0205671 | A1 | 11/2003 | Thomas et al. |
| 2004/0055699 | A1 | 3/2004 | Smith et al. |
| 2004/0206748 | A1 | 10/2004 | Dreher |
| 2005/0036905 | A1 | 2/2005 | Gokturk |
| 2005/0116336 | A1 | 6/2005 | Chopra et al. |
| 2005/0284232 | A1 | 12/2005 | Rice |
| 2006/0169788 | A1 | 8/2006 | Empedocles et al. |
| 2006/0237416 | A1 | 10/2006 | Twerdochlib |
| 2006/0278631 | A1 | 12/2006 | Lee et al. |
| 2007/0041887 | A1 | 2/2007 | Veedu et al. |
| 2007/0132043 | A1 | 6/2007 | Bradley et al. |
| 2007/0138010 | A1 | 6/2007 | Ajayan |
| 2007/0170170 | A1 | 7/2007 | Sata et al. |
| 2007/0210073 | A1 | 9/2007 | Hubert et al. |
| 2007/0222472 | A1 | 9/2007 | Raravikar et al. |
| 2007/0230085 | A1 | 10/2007 | Le |
| 2007/0251294 | A1 | 11/2007 | Tanaka et al. |
| 2008/0039557 | A1 | 2/2008 | Li et al. |
| 2008/0045879 | A1 | 2/2008 | Prausnitz et al. |
| 2008/0075954 | A1 | 3/2008 | Wardle et al. |
| 2008/0152926 | A1 | 6/2008 | Baikerikar et al. |
| 2008/0170982 | A1 | 7/2008 | Zhang et al. |
| 2008/0173111 | A1 | 7/2008 | Thostenson et al. |
| 2008/0283516 | A1 | 11/2008 | Talle et al. |
| 2008/0290080 | A1 | 11/2008 | Weiss |
| 2009/0107987 | A1 | 4/2009 | Stepanian |
| 2009/0117363 | A1 | 5/2009 | Wardle et al. |
| 2009/0121727 | A1 | 5/2009 | Lynch et al. |
| 2009/0140098 | A1 | 6/2009 | Lengsfeld et al. |
| 2009/0194525 | A1 | 8/2009 | Lee et al. |
| 2009/0199569 | A1 | 8/2009 | Petrenko |
| 2009/0218320 | A1 | 9/2009 | Wang |
| 2009/0268556 | A1 | 10/2009 | Jiang et al. |
| 2009/0272731 | A1 | 11/2009 | Olding et al. |
| 2009/0272935 | A1 | 11/2009 | Hata et al. |
| 2009/0277897 | A1 | 11/2009 | Lashmore et al. |
| 2009/0278685 | A1 | 11/2009 | Potyrailo et al. |
| 2009/0311166 | A1 | 12/2009 | Hart et al. |
| 2010/0045311 | A1 | 2/2010 | Chung |
| 2010/0122980 | A1 | 5/2010 | Wang et al. |
| 2010/0126981 | A1 | 5/2010 | Heintz et al. |
| 2010/0141095 | A1 | 6/2010 | Park |
| 2010/0156249 | A1 | 6/2010 | Choi et al. |
| 2010/0188833 | A1 | 7/2010 | Liang et al. |
| 2010/0196695 | A1 | 8/2010 | Garcia et al. |
| 2010/0249877 | A1 | 9/2010 | Naughton |
| 2010/0255303 | A1 | 10/2010 | Wardle et al. |
| 2010/0270704 | A1 | 10/2010 | Feng et al. |
| 2011/0088931 | A1 | 4/2011 | Lettow et al. |
| 2011/0101823 | A1 | 5/2011 | Anderson et al. |
| 2011/0142091 | A1 | 6/2011 | Wardle et al. |
| 2011/0167781 | A1 | 7/2011 | Maheshwari |
| 2011/0215086 | A1 | 9/2011 | Yeh |
| 2011/0222225 | A1 | 9/2011 | Kessler et al. |
| 2011/0240621 | A1 | 10/2011 | Kessler et al. |
| 2011/0240751 | A1 | 10/2011 | Rauh et al. |
| 2011/0266275 | A1 | 11/2011 | Rateiczak |
| 2011/0290784 | A1 | 12/2011 | Orawetz et al. |
| 2012/0055918 | A1 | 3/2012 | Yue et al. |
| 2012/0138595 | A1 | 6/2012 | Watakabe et al. |
| 2012/0292439 | A1 | 11/2012 | Hallander et al. |
| 2013/0043342 | A1 | 2/2013 | Nordin et al. |
| 2013/0058859 | A1 | 3/2013 | Steiner, III et al. |
| 2013/0064587 | A1 | 3/2013 | Jeong et al. |
| 2013/0244121 | A1 | 9/2013 | Gogotsi et al. |
| 2014/0034783 | A1 | 2/2014 | Miller et al. |
| 2014/0070054 | A1 | 3/2014 | Burton et al. |
| 2014/0079601 | A1 | 3/2014 | Rubner et al. |
| 2014/0117006 | A1 | 5/2014 | Wright et al. |
| 2014/0269830 | A1 | 9/2014 | Wardle et al. |
| 2015/0096969 | A1 | 4/2015 | Uprety et al. |
| 2016/0302264 | A1 | 10/2016 | Kessler et al. |
| 2016/0366724 | A1 | 12/2016 | Kessler et al. |
| 2018/0332666 | A1 | 11/2018 | Kessler et al. |

FOREIGN PATENT DOCUMENTS

| | | | |
|---|---|---|---|
| WO | WO-2004/003096 | A1 | 1/2004 |
| WO | WO-2004/065926 | A1 | 8/2004 |
| WO | WO-2006/004733 | A1 | 1/2006 |
| WO | WO-2007/136264 | A1 | 11/2007 |
| WO | WO-2007/136755 | A2 | 11/2007 |
| WO | WO-2008/054541 | A2 | 5/2008 |
| WO | WO-2008/135606 | A1 | 11/2008 |

(56) References Cited

FOREIGN PATENT DOCUMENTS

| WO | WO-2009/029218 A2 | 3/2009 |
|---|---|---|
| WO | WO-2009/141472 A1 | 11/2009 |
| WO | WO-2011/087412 A1 | 7/2011 |
| WO | WO-2012/092623 A2 | 7/2012 |
| WO | WO-2013/011306 A1 | 1/2013 |
| WO | WO-2013/172762 A1 | 11/2013 |

OTHER PUBLICATIONS

Ahmed et al., Heat emitting layers for enhancing NDE of composite structures. Composites: Part A. Jun. 2008;39(6):1025-1036.

Ajayan et al., Materials science: nanotube composites. Nature. Jun. 28, 2007;447(7148):1066-8.

Bar-Cohen, Emerging NDE Technologies and Challenges at the Beginning of the 3rd Millennium, Part 1. Mater Eval. Jan. 2000;58(1):17-30.

Bar-Cohen, NDE of Fiber-Reinforced Composite Materials—A Review. Mater Eval. Mar. 1986;44:446-454.

Barber et al., Health Monitoring of Aligned Carbon Nanotube (CNT) Enhanced Composites. Proceedings of the SAMPE Fall Technical Conference, Wichita, KS, Oct. 19-22, 2009, 9 pages.

Barreiro et al., Subnanometer motion of cargoes driven by thermal gradients along carbon nanotubes. Science. May 9, 2008;320(5877):775-8.

Baughman et al., Carbon nanotubes—the route toward applications. Science. Aug. 2, 2002;297(5582):787-92.

Bekyarova et al., Multiscale carbon nanotube-carbon fiber reinforcement for advanced epoxy composites. Langmuir. Mar. 27, 2007;23(7):3970-4.

Boger et al., Load and Health Monitoring in Glass Fibre Reinforced Composites with an Electrically Conductive Nanocomposite Epoxy Matrix. Composites Science and Technology. 2008;68:1886-1894.

Bouvier, Investigating Variables in Thermographic Composite Inspection. Mater Eval. May 1995;53(5):544-551.

Cebeci et al., Multifunctional Properties of High Volume Fraction Aligned Carbon Nanotube Polymer Composites with Controlled Morphology. Composites Science and Technology. 2009;69:2649-2656.

Coleman et al., Small but strong: A review of the mechanical properties of carbon nanotube-polymer composites. Carbon. 2006;44(9):1624-1652.

Dharap et al., Nanotube film based on single-wall carbon nanotube for strain sensing. Nanotechnology. 2004;15:379-82.

Du et al., Effect of Nanotube Alignment on Percolation Conductivity in Carbon Nanotube/Polymer Composites. Physical Review B. 2005;72(12)121404. 5 pages.

Dzenis, Materials science. Structural nanocomposites. Science. Jan. 25, 2008;319(5862):419-20.

Fernandez et al., Materials for aesthetic, energy-efficient, and self-diagnostic buildings. Science. Mar. 30, 2007;315(5820):1807-10.

Fiedler et al., Can Carbon Nanotubes be used to Sense Damage in Composites? Annales de Chimie Science des Matériaux. Nov.-Dec. 2004;29:81-94.

Garcia et al., Fabrication and multifunctional properties of a hybrid laminate with aligned carbon nanotubes grown in situ. Composite Science and Technology. 2008;68:2034-2041.

Garcia et al., Fabrication and Multifunctional Properties of High Volume Fraction Aligned Carbon Nanotube Thermoset Composites. Journal of Nano System & Technology. Oct. 2009;1(1):1-11.

Garcia et al., Fabrication and Testing of Long Carbon Nanotubes Grown on the Surface of Fibers for Hybrid Composites. 47th AIAA/ASME/ASCE/AJS/ASC Structures, Structural Dynamics, and Materials Conference. 2006. Newport, R.I., 11 pages.

Garcia et al., Fabrication of composite microstructures by capillarity-driven wetting of aligned carbon nanotubes with polymers. Nanotechnology. 2007;18(16):165602, 11 pages.

Garcia et al., Long Carbon Nanotubes Grown on the Surface of Fibers for Hybrid Composites. AIAA Journal. Jun. 2008;46(6):1405-1412.

Giorleo et al., Comparison Between Pulsed and Modulated Thermography in Glass-Epoxy Laminates. NDT&E International. 2002;35:287-292.

Giorleo et al., Location and Geometry of Defects in Composite Laminates from Infrared Images. Journal of Materials and Performance. Jun. 1998;7:367-374.

Gojny et al., Carbon nanotube-reinforced epoxy-composites: enhanced stiffness & fracture toughness at low nanotube content. Composites Science & Technology. 2004;64(15):2363-2371.

Goldfine et al., Conformable Eddy Current Sensors and Methods for Gas Turbine Inspection and Health Monitoring. Gas Turbine Materials Technology. pp. 105-114 (1999).

Goldfine et al., Conformable Eddy-Current Sensors and Arrays for Fleetwide Gas Turbine Component Quality Assessment. ASME Journal of Engineering for Gas Turbines and Power. Oct. 2002;124(4):904-909.

Guzman de Villoria et al., High-Yield Growth of Vertically Aligned Carbon Nanotubes on a Continuously Moving Substrate. Nanotechnology. 2009;20:405611, 8 pages.

Guzman de Villoria et al., Mechanical model to evaluate the effect of the dispersion in nanocomposites. Acta Mater. 2007;55(9):3025-3031.

Hogg, Composites in Armor. Science. 2006;314:1100-1101.

Hou et al., Spatial Conductivity Mapping of Carbon Nanotube Composite Thin Films by Electrical Impedance Tomography for Sensing Applications. Nanotechnology. 2007;18:315501, 9 pages.

Hung et al., Review and Comparison of Shearography and Active Thermography for Nondestructive Evaluation. Materials Science and Engineering R. 2009;64:73-112.

Jeong et al., Synergistic Strengthening Effect of Ultrafine-Grained Metals Reinforced with Carbon Nanotubes. Small. 2007;3(5):840-844.

Kessler et al., Damage detection in composite materials using Lamb wave methods. Smart Materials and Structures. 2002;11:269-278.

Koerner et al., Remotely Actuated Polymer Nanocomposites-Stress-Recovery of Carbon-Nanotube-Filled Thermoplastic Elastomers. Nature Materials. 2004;3:115-120.

Kupke et al., Non-Destructive Testing of FRP by D.C. and A.C. Electrical Methods. Composites Science and Technology. 2001;61:837-847.

Li et al., Sensors and actuators based on carbon nanotubes and their composites: A review. Composites Science and Technology. 2008;68(6):1227-1249.

Li et al., Solution of Transient Temperature Field for Thermographic NDT Under Joule Effect Heating. Journal of Heat Transfer. Jul. 2005;127(7):670-674.

Loh et al., Carbon Nanotube Sensing Skins for Spatial Strain and Impact Damage Identification. J Nondestruct Eval. 2009;28:9-25.

Mieres et al., Description of a Traffic Bridge of the Cantabrian SpeedWay Made of Composite Materials. Materiales de Construcción. Oct.-Dec. 2006;56(284):81-86.

Miravete et al., Corrosion Study of Fiberglass Rebars Embedded in Concrete: One Case Study. Corrosion 2007 (NACE International), Mar. 11-15, 2007, Nashville, TN. Paper No. 07534, 12 pages.

Musso et al., Influence of carbon nanotubes structure on the mechanical behavior of cement composites. Compos Sci Technol. 2009;69:1985-1990.

Nofar et al., Failure detection and monitoring in polymer matrix composites subjected to static and dynamic loads using carbon nanotube networks. Composites Science and Technology. 2009;69:1599-1606.

Pop et al., Thermal Conductance of an Individual Single-Wall Carbon Nanotube above Room Temperature. Nano Lett. 2006;6(1):96-100.

Qiu et al., Carbon nanotube integrated multifunctional multiscale composites. Nanotechnology. 2007;18(27):275708, 11 pages.

Raghavan et al., Structural Health Monitoring using Carbon Nanotube (CNT) Enhanced Composites. 7th International Workshop on SHM (IWSHM07), Stanford University, Sep. 9-11, 2009, 9 pages.

Roach, Assessing conventional and advanced NDI for composite aircraft. High-Performance Composites. 2008;16(4):72-75.

(56) References Cited

OTHER PUBLICATIONS

Sakagami et al., Applications of pulse heating thermography and lock-in thermography to quantitative nondestructive evaluations. Infrared Physics & Technology. 2002; 43(3-5):211-218.

Sakagami et al., New Flaw Inspection Technique Based on Infrared Thermal Images under Joule Effect Heating. JSME International Journal, Series A: Mechanics and Material Engineering. 1994;37(4):380-388.

Salvetat et al., Elastic and Shear Moduli of Single-Walled Carbon Nanotube Ropes. Physical Review Letters. Feb. 1, 1999;82(5):944-947.

Schulte et al., Editorial. Composites Science and Technology. 2007;67(5):777.

Staszewski et al., Fatigue crack detection in metallic structures with Lamb waves and 3D laser vibrometry. Measurement Science & Technology. 2007;18(3):727-739.

Thostenson et al., Advances in the science and technology of carbon nanotubes and their composites. Composites Science & Technology. 2001;61(13):1899-1912.

Thostenson et al., Carbon Nanotube Networks: Sensing of Distributed Strain and Damage for Life Prediction and Self-Healing. Advanced Materials. 2006;18(21):2837-2841.

Thostenson et al., Nanocomposites in Context. Composites Science and Technology. 2005;65(3-4):491-516.

Thostenson et al., Real-time in situ sensing of damage evolution in advanced fiber composites using carbon nanotube networks. Nanotechnology. May 28, 2008;19(21):215713, 6 pages.

Treacy et al., Exceptionally high Young's modulus observed for individual carbon nanotubes. Nature. Jun. 20, 1996;381(6584):678-680.

Triantafillou, Strengthening of Structures with Advanced FRPs. Progress in Structural Engineering and Materials. 1998;1(2):126-134.

Vaia et al., Materials science. Adaptive composites. Science. Jan. 25, 2008;319(5862):420-1.

Veedu et al., Multifunctional composites using reinforced laminae with carbon-nanotube forests. Nat Mater. Jun. 2006;5(6):457-62.

Wardle et al., Fabrication and Characterization of Ultrahigh-Volume-Fraction Aligned Carbon Nanotube-Polymer Composites. Advanced Materials. 2008;20:2707-2714.

Wardle et al., Particle and Fiber Exposures During Processing of Hybrid Carbon-Nanotube Advanced Composites. *2008 SAMPE Fall Technical Conference*. Sep. 2008. Memphis, TN. 15 pages.

Wei et al., Reliability and current carrying capacity of carbon nanotubes. *Applied Physics Letters*. Aug. 20, 2001;79(8):1172-1174.

Weritz et al., Investigation of Concrete Structures with Pulse Phase Thermography. *Materials and Structures*. Nov. 2005;38:843-849.

Wicks et al., Fracture Toughness of a Woven Advanced Composite Reinforced with Aligned Carbon Nanotubes. *50th AIAA/ASME/ASCE/AHS/ASC Structures, Structural Dynamics, and Materials Conference*. 2009. Palm Springs, CA, 5 pages.

Wicks et al., Interlaminar and Intralaminar Reinforcement of Composite Laminates with Aligned Carbon Nanotubes. *Composite Science and Technology*. 2010;70:20-28.

Yamamoto et al., High-yield growth and morphology control of aligned carbon nanotubes on ceramic fibers for multifunctional enhancement of structural composites. Carbon. 2009;47(3):551-560.

Yamamoto et al., Mechanical, Thermal, and Electrical Properties of Woven Laminated Advanced Composites Containing Aligned Carbon Nanotubes. 17th International Conference on Composite Materials (ICCM), Edinburgh, Scotland, Jul. 27-31, 2009, 3 pages.

Yi et al., Statistical geometry of random fibrous networks, revisited: Waviness, dimensionality, and percolation. Journal of Applied Physics. Aug. 1, 2004;96(3):1318-1327.

Yu et al., Strength and breaking mechanism of multiwalled carbon nanotubes under tensile load. Science. Jan. 28, 2000;287(5453):637-40.

Zahn, Optical, Electrical and Electromechanical Measurement Methodologies of Fields, Charge and Polarization in Dielectrics. IEEE Transactions on Dielectrics and Electrical Insulation. Oct. 1998;5(5):627-650.

Zhang et al., Carbon nanotube/polycarbonate composites as multifunctional strain sensors. J Nanosci Nanotechnol. Apr. 2006:6(4):960-4.

Zhu et al., Processing a glass fiber reinforced vinyl ester composite with nanotube enhancement of interlaminar shear strength. Composites Science and Technology. 2007;67(7-8):1509-1517.

European Office Action for Application No. 15810988.4, dated Jul. 16, 2021, 5 pages.

European Office Action for Application No. 15810988.4, dated Sep. 24, 2019, 6 pages.

International Search Report and Written Opinion for Application No. PCT/US15/24262 dated Feb. 2, 2016.

Supplementary European Search Report for Application No. 15810988.4, dated Nov. 7, 2017. 11 pages.

European Office Action for Application No. 15810988.4, dated Nov. 16, 2022, 6 pages.

U.S. Appl. No. 13/014,603, filed Jan. 26, 2011, U.S. Pat. No. 9,091,657, Issued.

U.S. Appl. No. 15/067,062, filed Mar. 10, 2016, U.S. Publication No. 2016-0366724, Abandoned.

U.S. Appl. No. 15/250,340, filed Aug. 29, 2016, U.S. Pat. No. 9,839,073, Issued.

U.S. Appl. No. 15/830,799, Dec. 4, 2017, U.S. Publication No. 2018-0332666, Published.

U.S. Appl. No. 14/678,066, filed Apr. 3, 2015, U.S. Pat. No. 11,438,973, Issued.

100

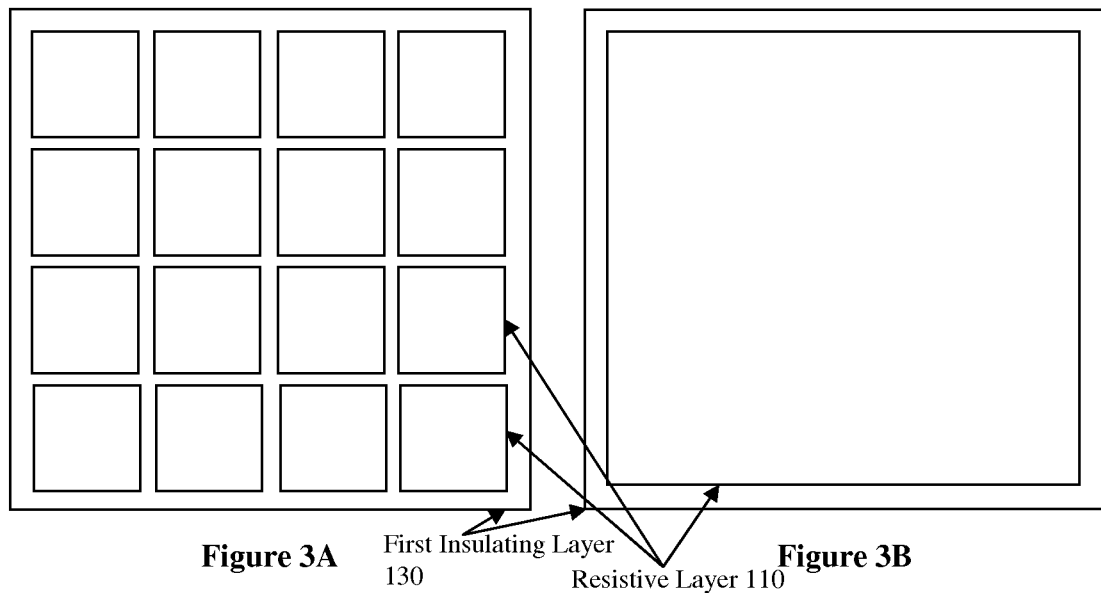
Figure 3A First Insulating Layer 130  Resistive Layer 110  Figure 3B
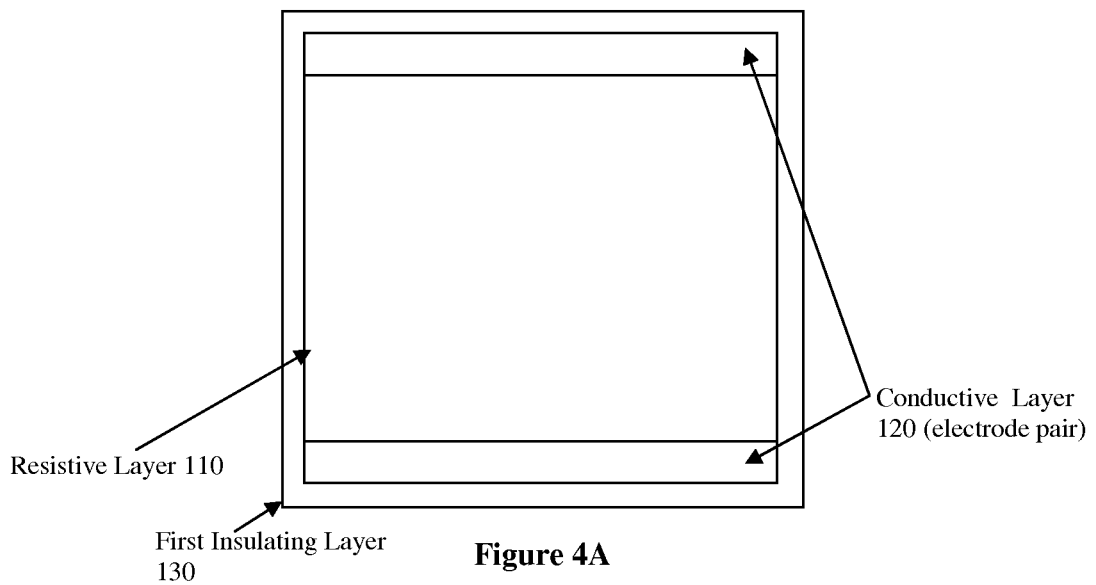
Resistive Layer 110
First Insulating Layer 130
Conductive Layer 120 (electrode pair)
Figure 4A

MULTIFUNCTIONAL ASSEMBLIES

CROSS-REFERENCE TO RELATED APPLICATIONS

The present application is a continuation of U.S. application Ser. No. 14/678,066, filed on Apr. 3, 2015, which claims the benefit of provisional patent application entitled "Conductive Curing using a Multifunctional Electro-Thermo-Mechanical Conformal Assembly" which was filed on Apr. 10, 2014 and assigned Ser. No. 61/978,152. The present application also claims the benefit of provisional patent application entitled "Conductive Curing using a Multifunctional Electro-Thermo-Mechanical Conformal Assembly" which was filed on Apr. 10, 2014 and assigned Ser. No. 61/978,154. The present application also claims the benefit of provisional patent application entitled "Multifunctional Assemblies" which was filed on Sep. 30, 2014 and assigned Ser. No. 62/057,728. The entire contents of the foregoing patent applications are incorporated herein by reference in their entirety.

The present application claims the benefit of provisional patent application entitled "Conductive Curing using a Multifunctional Electro-Thermo-Mechanical Conformal Assembly" which was filed on Apr. 10, 2014 and assigned Ser. No. 61/978,152. The present application also claims the benefit of provisional patent application entitled "Conductive Curing using a Multifunctional Electro-Thermo-Mechanical Conformal Assembly" which was filed on Apr. 10, 2014 and assigned Ser. No. 61/978,154. The present application also claims the benefit of provisional patent application entitled "Multifunctional Assemblies" which was filed on Sep. 30, 2014 and assigned Ser. No. 62/057,728. The entire contents of the foregoing provisional patent applications are incorporated herein by reference.

STATEMENT OF GOVERNMENT INTEREST

The United States government may hold license or other rights in this invention as a result of financial support provided by governmental agencies in the development of aspects of the invention. Parts of this work were supported by grants from the Air Force Office of Scientific Research, Contract Nos. FA9550-09-C-0165 and FA9550-11-C-0002; the Air Force Research Laboratory Wright Research Site, Contract No. FA8650-14-M-2480; the Naval Air Warfare Center, Contract Nos. N68335-10-C-0227 and N68335-11-C-0424; the Office of Naval Research, Contract No. N00014-12-C-0316; and the Naval Sea Systems Command, Contract No. N00024-12-P-4069.

BACKGROUND

Monitoring, operating, and maintaining complex structures and systems conventionally requires an array of separate, special purpose systems. For example, a conventional airframe structure, to facilitate inspection may have a distribution of sensors secured to a surface to provide feedback on the structure. To facilitate communication, a plurality of separate antennae must be attached to or installed through the surface of the airframe structure. Still further, to facilitate a de-icing function, a plurality of electrical heating elements must be installed adjacent to the surface of the airframe structure. Each of these separate systems and its constituent components then requires separate installation onto or through the surface, separate power supplies, separate wiring, separate controllers, etc. Due to the narrow focus of each system and the plurality of redundant components, such arrangements result in wasted space, high manufacturing/installation costs, limited functionality and performance, and excess weight.

SUMMARY

Exemplary embodiments of multifunctional assemblies and methods of forming and using the same are described herein and summarized below. These exemplary embodiments are not intended to limit the scope of the claimed invention which may encompass a variety of forms which differ from these summaries.

One embodiment taught herein is directed to a multifunctional assembly. The multifunctional assembly includes a layered structure. The layered structure includes a first resistive layer, a first conductive layer adjacent the first resistive layer, a first pair of insulating layers including a first insulating layer disposed across the first resistive layer and a second insulating layer disposed across the first conductive layer on a side opposing the first resistive layer. The multifunctional assembly also includes a first plurality of electrical breakout points. The first conductive layer is configured to distribute an electrical current across the resistive layer.

Another embodiment taught herein is directed to a method for manufacturing an object incorporating a multifunctional assembly having a layered structure. The layered structure includes a first resistive layer, a first conductive layer adjacent the first resistive layer and a first pair of insulating layers. The first pair of insulating layers include a first insulating layer disposed across the first resistive layer and a second insulating layer disposed across the first conductive layer on a side opposing the first resistive layer. The method includes flowing electrical current through the resistive layer so as to generate heat. The method also includes using the generated heat to treat or cure an integral component of the object.

Another embodiment taught herein is directed to an assembled object comprising a multifunctional assembly having a layered structure. The layered structure includes a first resistive layer, a first conductive layer adjacent the first resistive layer, and a first pair of insulating layers including a first insulating layer disposed across the first resistive layer and a second insulating layer disposed across the first conductive layer on a side opposing the first resistive layer. The assembled object is formed in part by flowing electrical current through the resistive layer so as to generate heat and using the generated heat to treat or cure an integral component of the assembled object.

Another embodiment taught herein is directed to a system. The system includes an object formed incorporating a multifunctional assembly having a layered structure. The layered structure includes a first resistive layer, a first conductive layer adjacent the first resistive layer, and a first pair of insulating layers. The first pair of insulating layers include a first insulating layer disposed across the first resistive layer and a second insulating layer disposed across the first conductive layer on a side opposing the first resistive layer. The system also includes a control system operationally coupled to the resistive layer via the conductive layer and configurable or programmable to drive the resistive layer with electrical energy to maintain or change a temperature of the object.

Another embodiment taught herein is directed to a system. The system includes an object formed incorporating a multifunctional assembly having a layered structure. The layered structure includes a first resistive layer, a first conductive layer adjacent the first resistive layer, and a first pair of insulating layers. The first pair of insulating layers includes a first insulating layer disposed across the first resistive layer and a second insulating layer disposed across the first conductive layer on a side opposing the first resistive layer. The system also includes a control system operationally couplable to the resistive layer via the conductive layer and configurable or programmable to detect a change in a physical property or characteristic of the object.

Another embodiment taught herein is directed to a multifunctional assembly. The multifunctional assembly includes a resistive element. The multifunctional assembly also includes a conductive element in electrical communication with the resistive element. The conductive element defines at least one of a plurality of multifunctional zones of the resistive element. The conductive element is configured to direct a flow of electricity across at least one of the plurality of multifunctional zones of the resistive element in a preselected manner.

Additional features, functions and benefits of the disclosed systems will be apparent from the description which follows, particularly when read in conjunction with the appended figures.

BRIEF DESCRIPTION OF THE DRAWINGS

FIG. 3A depicts a resistive layer defining a plurality of modular sections thereof, according to the present disclosure.

FIG. 3B depicts a resistive layer defining a single unitary section, according to the present disclosure.

FIG. 4A depicts a conductive layer defining an electrode pair for a resistive layer, according to the present disclosure.

FIG. 4B depicts a conductive layers defining a grid of electrode pairs for a resistive layer, according to the present disclosure.

DESCRIPTION OF EXEMPLARY EMBODIMENT(S)

Figure 1:
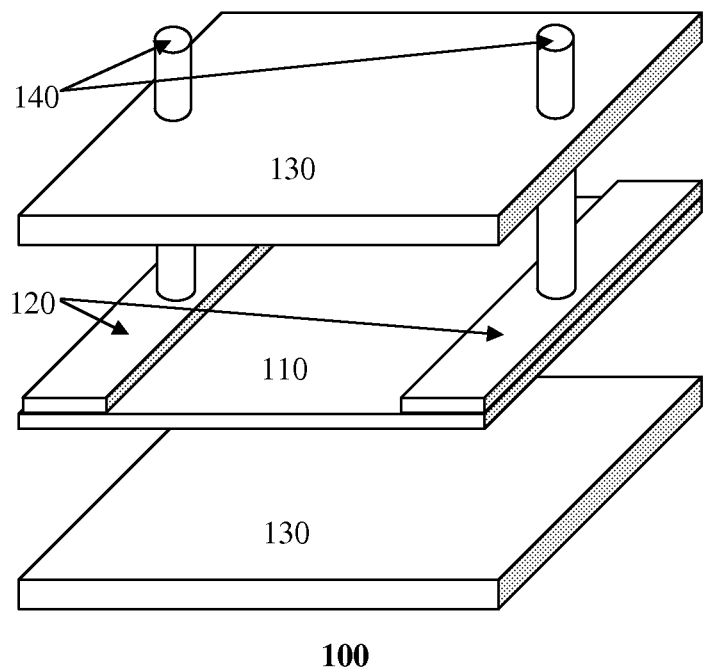
FIG. 1 depicts an exploded view of an exemplary multifunctional assembly, according to the present disclosure.

As used herein, unless specified otherwise, structure refers to a physical makeup of the way an object is assembled.

As used herein, structural and structural capability refer to elements and properties, respectively, of a structure relating to the structure's ability to withstand one or more forces applied to the structure. Such forces can include, for example but not limited to, tension forces, bending forces, torsion forces, compression forces, vibration forces, aerodynamic forces, impact forces, or any other force applied to one or more structures.

The subject application relates to novel apparatus, systems and methods which enable multifunctional assemblies for application on or integration with one or more objects. The multifunctional assemblies include multifunctional operational characteristics that extend a primary operational characteristic of an object to include one or more secondary characteristics. Primary and secondary characteristics, in accordance with various embodiments, can include, for example, one or more of defining a structural ability or capability of the object, structural health monitoring, heating, curing, self-curing, de-icing, event notification feedback, structural integrity feedback, usage feedback, shape feedback, configuration feedback, load capabilities, added stiffness, desired flexibility, and the like within the components and members forming the primary operational characteristic. For example, the primary operational characteristic of a wing or fuselage of an aircraft may be to provide sufficient lift for flight while maintaining the structural ability to withstand forces associated with take off, flight, and landing. Such wings and fuselages may be formed in accordance with a layered stackup as taught herein to provide the primary operational characteristics and further provide one or more secondary operational characteristics such as, for example, any of the characteristics described above without the need for conventional sensors and detectors secured to a surface of the object.

The disclosed apparatus, systems, and methods, in accordance with various embodiments, enable assemblies to have multifunctional capabilities to provide structural support for withstanding one or more forces, structural feedback, generating heat, structural self-healing (e.g., using heat to re-form or re-cure damaged thermoplastic or other heat-formable materials), antennae, additional structural properties (e.g., stiffness, strength), or any other suitable function in a single assembly applied to or integrated with an object.

New and advantageous multifunctional assemblies with multifunctional properties are disclosed herein. As used herein, the term "multifunctional assembly" refers to an assembly which enables functions or operations or both that extend beyond the primary function of the assembly, e.g., if the primary function is structural this refers to the structural ability of an object to withstand one or more forces applied thereto. For example, a single multifunctional assembly may advantageously enable structural feedback for the assembly such as damage or impact detection, provide heat generation such as for deicing or curing of various materials, or provide other functions or operations. Thus, in general, a multifunctional assembly may incorporate a stacked layered construction including a resistive layer (also referred to herein as the "functional layer") which may enable one or more specific functions or operations that extend beyond the structural ability of the assembly to withstand one or more forces.

In exemplary embodiments, the multifunctional assemblies disclosed herein may enable structural feedback, for example, structural health feedback, for objects manufactured from or otherwise incorporating the multifunctional assemblies. For example, a multifunctional assembly disclosed herein may enable detecting and, in some embodiments, characterizing structural damage or other structural changes to an object manufactured from or otherwise incorporating the multifunctional assembly. In some embodiments, characterization of the structural damage or other structural changes may include determining spatial information, such as size, shape, position, orientation and the like, for a damaged or otherwise deformed region of the object.

In other exemplary embodiments, the multifunctional assemblies disclosed herein may enable generating heat. In some embodiments, heat generated from a multifunctional assembly taught herein may be used to heat, for example, cure, the multifunctional assembly itself or other materials associated therewith. Such heat generation may be implemented as part of a manufacturing process for an object manufactured from or otherwise incorporating a multifunctional assembly. Thus, advantageously, the multifunctional assembly or associated object can cycle through a curing process without the need for a curing oven or the like. In other embodiments, heat generated from a multifunctional assembly may be used to heat an object manufactured from or otherwise incorporating the multifunctional assembly. In some embodiments, the heating of the object may be used to heat another material by proxy (for example, to induce a state transition thereof) or maintain the other material at or above a selected temperature (for example to prevent a state transition thereof).

State, as used herein, refers to any state of matter such as, for example, solid, amorphous solid, semi-crystalline solid, crystalline solid, glass, plastic crystal, transition metal, liquid, liquid crystal, gas, plasma, or superfluid as well as, more generally, any gel, colloid, or suspension.

State transition, as used herein, refers to any transition from a first state to a second state including transition between states, including for example, melting, freezing, vaporization, condensation, sublimation, deposition, ionization, deionization, glass transition, softening (e.g., rubber softening), thermoplastic melting, cross-linking, thermal decomposition, non-linear polymerization, precipitation, or swelling (e.g., as in a gel).

In yet other exemplary embodiments, a multifunctional assembly disclosed herein may be used to enable antenna functions/operations (such as receiving, transmitting, absorbing or dissipating a signal) in an object manufactured from or otherwise incorporating the multifunctional assembly. For example, a multifunctional assembly may be selectively patterned to enable such antenna functions/operations, for example, to enable a specific signal propagation in the object. In some embodiments, a multifunctional assembly disclosed herein may be used to provide a conduit for thermal, acoustic or electrical energy in an object manufactured from or otherwise incorporating the multifunctional assembly.

It will be appreciated that multifunctional assemblies disclosed herein may enable a plurality of different functions/operations that extend beyond the primary functions and characteristics of the assembly. Thus, in some embodiments, a multifunctional assembly may, for example, enable structural feedback and heat generation in addition to providing structural support in an assembly that primarily functions as a structural component of an object.

With reference now to FIG. 1, an exploded view of an exemplary multifunctional assembly 100 is depicted. The multifunctional assembly 100 incorporates a stacked layered structure including a resistive layer 110, a conductive layer 120 adjacently stacked relative to the resistive layer 110 and a pair of insulating layers 130 stacked above and below the resistive and conductive layers 110 and 120. It will be apparent in view of this disclosure that conductance and resistance are directly inverse properties and that, therefore, the resistive layer 110 will be partially conductive and that the conductive layer 120 will be partially resistive. As used herein, a "resistive" layer 110 or material of the multifunctional assembly 100 exhibits relatively higher resistance and relatively lower conductance than a "conductive" layer 120 or material of the multifunctional assembly 100. For example and without limitation, in accordance with various embodiments, the conductive layer 120 can exhibit a conductivity 1.01×, 2×, 10×, 100×, or 1000× greater than the conductivity of the resistive layer 110. Similarly, as used herein, "insulating" layers 130 or materials can refer to completely non-conductive layers/materials or can refer to layers/materials that exhibit greater resistance than the resistive layer 110. Likewise, conductivity and resistivity as used herein may refer to electrical propagation properties, thermal propagation properties, acoustical propagation properties or any combination thereof.

The multifunctional assembly 100 may also generally include a set of breakout points 140 for bridging (e.g., electrically, thermally, or acoustically bridging) the conductive layer 120 (which can be, in accordance with various embodiments, electrically, thermally, or acoustically conductive) to an exterior environment, e.g., by traversing through one of the insulating layers 130.

As depicted in FIG. 1, the resistive layer 110 is electrically resistive, the conductive layer 120 is electrically conductive, the insulating layers 130 are electrically insulating, and the breakout points 140 are configured for electrical bridging. However, it will be apparent in view of this disclosure that any suitable combination of electrically, acoustically, or thermally conductive, resistive, or insulating layers can be used in accordance with various embodiments.

It will be apparent in view of this disclosure that, in accordance with various embodiments, each of the resistive layer 110, conductive layer 120, or the insulating layers 130 can comprise a single continuous layer or can comprise multiple discontinuous elements. For example, the resistive layer 110 may define a single continuous layer or a plurality of modular sections (resistive elements) as described in further detail below with reference to FIGS. 3A and 3B.

As noted above, the resistive layer 110 may advantageously enable one or more specific functionalities that extend beyond the structural characteristics of the assembly. For example, the resistive layer 110 may advantageously enable structural feedback, heat generation, signal propagation, heat sensing, viscosity (or other polymer state change) sensing, and the like.

In exemplary embodiments, the resistive layer 110 may be characterized by a resistivity in the range of 1-1000 ohm/sq and more preferably in the range of 5-500 ohm/sq. Examples of resistive layers which may be used include but are not limited to a carbon nanotube (CNT) network (such as an isolated CNT network or a CNT network deposited on a scrim, veil or other backing material), graphene, bucky paper, or other carbon derived morphology, metal filled plastic, metal filled rubber sheet, and the like. In exemplary embodiments, the CNT network may be constructed from a single ply (single sheet) or from multiple plies (multiple sheets) of a same or different resistivity which, for example, may be stitched or overlapped together to form a larger sheet. In some embodiments, the CNT network may be structured (e.g., CNTs are aligned relative to one another or relative to a substrate or otherwise arranged in a non-random manner) CNT network which may advantageously exhibit non-isotropic properties such as with respect to electrical conductivity and resistance thermal conductivity or acoustic propagation.

Exemplary materials which incorporate non-random CNT networks include structured CNT-engineered material. Structured CNT-engineered materials represent a relatively new class of materials, exemplary embodiments of which are described, inter alia, in U.S. Pat. No. 7,537,825, PCT Application No. PCT/US2007/011913 (WO/2008/054541), U.S. Pat. No. 8,337,979, and U.S. application Ser. No. 12/227,516 (US 2009/0311166). See also, Garcia E. J., Wardle, B. L., Hart J. A. and Yamamoto N., "Fabrication and multifunctional properties of a hybrid laminate with aligned carbon nanotubes grown in situ," *Composite Science and Technology*, v. 68, pp. 2034-41, 2008. Each of the foregoing patent and non-patent references is hereby incorporated herein to the extent that it is not inconsistent with the present disclosure. Structured CNT-engineered materials are also discussed in greater detail below.

In some embodiments, characteristics of the resistive layer 110, such as the size, shape, position, configuration and resistivity, may be selected so as to selectively pattern the multifunctional assembly 100 for a specific purpose. For example, resistive layer 110 may be configured to enable concentrating heat with respect to specific region(s) of the multifunctional assembly 100, propagating a signal in a particular direction or manner, or the like. Use of CNTs as described above can be particularly advantageous for heat generation functionality (e.g., self-curing or de-icing) because some CNTs are highly selective to microwave frequencies and can therefore heat very locally, providing greater process control as compared with conventional systems.

As depicted, the resistive layer 110 may be adjacently stacked relative to and operatively (for example, electrically, acoustically, thermally, etc.) associated with the conductive layer 120. In some embodiments, the conductive layer 120 may act as an electrical distributer, e.g., in order to direct a flow of electricity from the breakout points 140 and through the resistive layer 110 in a preselected (deliberate, for example, uniform) manner. In some embodiments, the conductive layer 120 may be used to break the resistive layer 110 into various multifunctional zones, each providing the same or different functionality. In yet further embodiments, the conductive layer 120 may be define a plurality of electrode pairs across the resistive layer, e.g., in a grid. In some embodiments, the multifunctional assembly 100 may include a first conductive layer adjacently stacked on one side of the resistive layer (e.g., defining a set of set if drive electrodes) and a second conductive layer adjacently stacked on the other side of the resistive layer (e.g., defining a set of reference electrodes).

In exemplary embodiments, the conductive layer 120 may comprise, for example, metal strips or metal meshes/foils (such as a lightning strike material). In other embodiments, the conductive layer 120 may exhibit a carbon derived morphology (e.g., CNT, graphene, bucky paper, or the like). In yet other embodiments, the conductive layer 120 may include a metal filled plastic or metal filled rubber sheet. In general, the conductive layer 120 may exhibit at least one hundred times (100×) the conductivity of the resistive layer 110 and, more preferably, at least one thousand times (1000×) the conductivity of the resistive layer 110. It may also be important that the resistive layer 110 and conductive layer 120 be chemically compatible, for example, so as to prevent/mitigate corrosion there between. Thus, in some embodiments, materials for the conductive layer 120 (and other conductive elements electrically coupled with respect to the resistive layer 110 such as conductive elements associated with breakout points 140) may be selected based on chemical compatibility with the resistive layer 110, for example, based on proximity on the galvanic order (see, e.g., MIL-STD-889B). Examples of compatible conductive layer materials for use with a CNT network based resistive layer 110 include, for example, titanium, platinum, and the like. In exemplary embodiments, a material for the conductive layer, for example a metal, may be plated or otherwise treated to be chemically compatible with the resistive layer.

The insulating layers 130 may advantageously electrically insulate the resistive and conductive layers 110 and 120 or any other element in the assembly from an exterior environment. The insulating layers 130 may also advantageously protect the resistive and conductive layers 110 and 120 from environmental conditions such as moisture, dust, and the like. In exemplary embodiments, the insulating layers 130 may be a film adhesive, a surfacing film, a glass filled epoxy prepreg sheet, a formable plastic sheet, a ceramic, or the like.

Breakout points 140 are provided for extending connectivity from the conductive layer 120 to an exterior environment. For example, breakout points 140 may include conductive elements, positioned adjacent and operatively (for example, electrically, acoustically, thermally, etc.) associated with the conductive layer 120. These conductive elements may then bridge to an exterior environment, for example, via apertures in the insulating layers 130. It may be preferable that conductive elements of the breakout points 140 not be in direct electrical communication with the resistive layer 110 but rather, be in indirect electrical communication with the resistive layer 110 via the conductive layer 120. This may be important to facilitate distributing or receiving electrical, acoustic or thermal energy over a larger surface area between breakout points (e.g., distributing electrical current prior to the current flowing through the resistive layer).

In exemplary embodiments, breakout points 140 may include a contact layer which may include for example, strips of metal, metal filled plastic or metal filled rubber, metallic disk elements or the like. The contact layer may be imbedded in the multifunctional assembly 100 stacked adjacent the conductive layer 120. Alternatively the contact layer may be integrally formed with or as part of the conductive layer 120. Typically, the contact layer may be thicker than the conductive layer 120, for example, at least ten times (10×) or, more preferably, at least one hundred times (100×) the thickness. Moreover, the contact layer may cover a smaller subset of the area covered by the conductive layer 120. In general the contact layer may be operatively associated with one or more contact elements. One example of a breakout point 140 includes a threaded stud which has a metallic base (acting as a contact layer) and a pin that sticks out which can be electrically connected, for example, via ring terminal. Another example of a breakout point 140 includes an imbedded metal disk or block (serving as a contact layer) associated with a countersunk screw.

As noted above, conductive elements of the breakout points 140 are typically chemically compatible with the conductive layer 120 or resistive layer 110, e.g., so as to prevent/mitigate corrosion between the breakout points 140 and the conductive layer 120 or the resistive layer 110. Thus, the conductive elements of the breakout points 140 generally utilize the same material(s) as the conductive layer 120 (for example, titanium, platinum, and the like). In exemplary embodiments, a material for the breakout points, for example a metal or electrically conductive composite, may be plated or otherwise treated to be chemically compatible with the conductive layer or the resistive layer.

Figure 10:
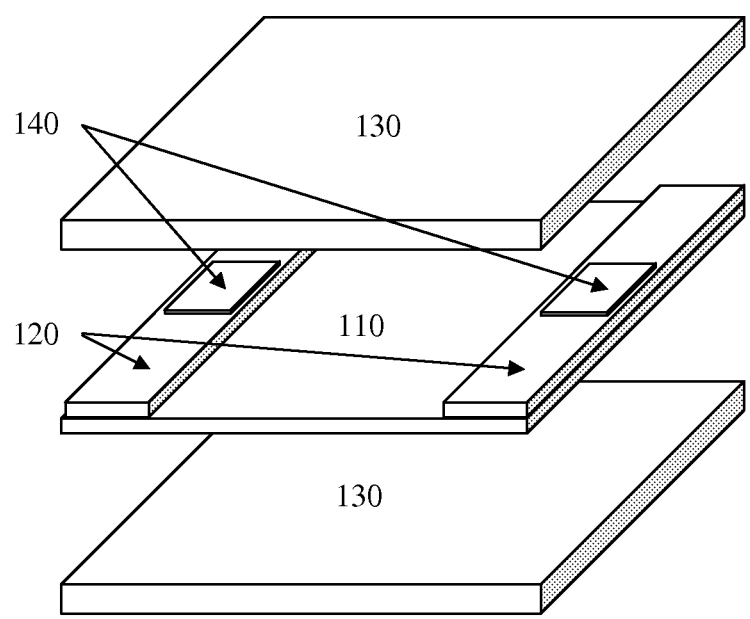
FIG. 10 depicts another exemplary multifunctional assembly according to the present disclosure.

In some exemplary embodiments breakout points 140 may include contactless coupling elements such as inductive charging/receiving elements; RFID LCR (inductance, capacitance, resistance) circuitry or the like, so as to enable contactless coupling with the conductive layer. Advantageously, contactless coupling elements may, in various embodiments, eliminate the need for forming apertures in the insulating layer 130 to accommodate breakout points 140. Additionally, contactless coupling elements may be advantageous, for example, for contactless measuring of changes in resistivity in the resistive layer (such as for damage detection) or for contactless driving of electrical energy through the resistive layer (such as for heat generation for curing, de-icing or other applications). FIG. 10, for example, illustrates an exemplary multifunctional assembly 1000, which incorporates a stacked layered structure including a resistive layer 110, a conductive layer 120 adjacently stacked relative to the resistive layer 110 and a pair of insulating layers 130 stacked above and below the resistive and conductive layers 110 and 120 and a set of electrical breakout points 140 which are illustrated as contactless coupling elements (for example, RFID LCR circuitry) for bridging the conductive layer 120 to an exterior environment.

It is noted that the specific layered structure of the exemplary multifunctional assembly 100 depicted in FIG. 1 is only intended to be illustrative and is not limiting. Indeed, alternative embodiments may include a layered structure incorporating a different combination of a stacked relationship of resistive, conductive and insulating layers. For example, in some embodiments, a multifunctional assembly may include a stacked plurality of resistive layers each resistive layer associated with one or more adjacently stacked conductive layers and a plurality of breakout points. In such embodiments, respective resistive layers (and associated conductive layers and breakout points) may be separated and insulated from one another via one or more insulating layers. (see, for example, the exemplary multifunctional assemblies 500, 600, and 700 of FIGS. 5-7). In some embodiments, breakout points may enable an electromechanical via concept which enables "drilling down" to make electrical contact with one or more desired/selected functional layer. Thus, in example embodiments a first functional layer may be optimized for deicing whereas a second functional layer (insulated from the first layer) may be configured for damage detection purposes. In some embodiments, breakout points may include via electrical connections between internal layers, for example, between a plurality of resistive layers, for example, for (internally) connecting the resistive layers in series or in parallel. In some embodiments, no breakout points 140 are included in the multifunctional assembly and one or more resistive layers can be configured to be selectively sensitive to radiation emitted by an external radiation source (e.g., microwave or other electromagnetic radiation). The selectively sensitive resistive layer(s) can, in accordance with various embodiments, generate heat when exposed to the external radiation source. In this manner the exemplary multifunctional assembly 100 can be directly heated by an external environment.

In exemplary embodiments, a multifunctional assembly may include an electrically conductive layer (CNT/graphene/bucky paper expanded metal foil or the like) to serve as lightning strike protection. This electrically conductive layer may be sandwiched by insulating layers and may be included as part of a stacked arrangement in a larger multifunctional assembly, for example, as part of a multifunctional assembly configured for de-icing. Advantageously, such a multifunctional assembly could be installed as described herein during curing of a part or onto an already fabricated part.

In further exemplary embodiments, a multifunction assembly may include an abrasion/erosion protection layer (Polytetrafluoroethylene (PTFE), for example) for protection from environmental elements such as sand, water, wind heat, cold, etc.

It will further be appreciated by a person of ordinary skill in the art that a multifunctional assembly may incorporate additional layers/materials (other than the resistive, conductive and insulating layers descried herein). For example, additional layers, such as metals, ceramics, and fiber (glass fiber, carbon fiber, basalt fiber, aramid fiber or the like) reinforced layers may be used to add strength to the assembly. Binding agents, such as adhesives or resins (polymer matrix), and various coatings (e.g., film adhesives, liquid resins, thermoplastic sheets, surfacing films, fiberglass pre-pregs, and the like) may also be incorporated. In some embodiments shape memory materials such as shape memory alloys, piezoelectric actuators or sensors and the like may be included as well. In general, the desired specifications for an object being manufactured from or otherwise incorporating a multifunctional assembly may dictate the specific requirements for the multifunctional assembly utilized. For example, a lightning strike layer may be included as an outer layer on one or both sides of the stackup.

Figure 2:
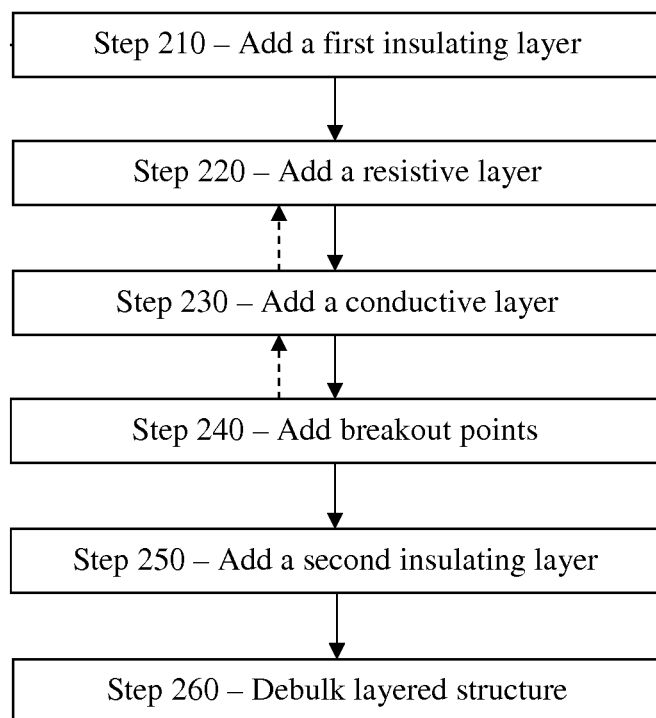
FIG. 2 depicts a flow diagram of an exemplary process for manufacturing the multifunctional assembly of FIG. 1, according to the present disclosure.

With reference to FIG. 2, a flow diagram is depicted of an exemplary process 200 for manufacturing a multifunctional assembly such as the multifunctional assembly 100 of FIG. 1. Process 200 may involve, at step 210, laying down a first insulating layer as a base layer for the multifunctional assembly. In exemplary embodiments, the first insulating layer may be configured, e.g., sized and shaped, based on a desired configuration of the multifunctional assembly, e.g., for forming or incorporation thereof into a specific object (such as an airplane wing). For example, the insulating layer may generally define a base of the object, a cross-section of the object or even a cross-section of a functionalized section/portion of the object. In exemplary embodiments laying down the first insulating layer may include a molding process, printing process, or other process (e.g., printing, applied wet-layup, thermoforming, compression or injection molding, automated fiber-placement, direct write and the like). At step 220, a resistive layer is stacked relative to the base insulating layer. In some embodiments, the resistive layer is stacked directly onto the first insulating layer which, in some embodiments can be an insulating or semi-insulating substrate. In other embodiments, the resistive layer is stacked onto the first insulating layers with an intermediate layer in between (for example an intermediate adhesive layer, buffer layer, alignment layer or the like). In example embodiments, the resistive layer may include a plurality of stitched or overlapped layers of a resistive material such as including a CNT network (e.g., a structured CNT-engineered material including a non-random CNT network) or any other carbon nanostructure network (e.g., a network including graphene, carbon nanofibers (CNF), CNT, carbon black, carbon nanohorns, C60, or any other suitable carbon nanostructure). In general, the resistive layer may cover one or more discrete regions within the surface boundaries of the first insulating layer (e.g., without overlapping the edges of the insulating layer. Thus, in some embodiments, the resistive layer may define a plurality of modular sections thereof, for example a grid of modular sections of substantially equal proportions and size (see, e.g., first insulating layer 130 and resistive layer 110 in FIG. 3A). This may advantageously enable localizing functions/operations or simultaneously performing different functions/operations utilizing different sections. It will be apparent in view of this disclosure that, in accordance with various embodiments, each modular section need not be of substantially equal proportions and size and that features such as conductivity, size, material type, etc. can be customized as appropriate for a particular functionality. It will be further apparent in view of this disclosure that, in accordance with various embodiments, the resistive layer 110 as shown in FIG. 3A can be configured with each of the modular sections in electrical communication with each of the other modular sections, each of the modular sections electrically isolated from each of the other modular sections, some of the modular sections in electrical communication with a portion of the modular sections but electrically isolated from the other modular sections, any combination thereof, or any other suitable configuration. In other embodiments, the resistive layer may define a single unitary section (see, e.g., first insulating layer 130 and resistive layer 110 in FIG. 3B).

In some embodiments, the resistive layer may cover substantially the entire surface area defined by the insulating base layer with the exception of some spacing relative to edge boundaries defined by the base insulating layer and any spacing between modular sections of the resistive layer (should the resistive layer include modular sections). In exemplary embodiments, the resistive layer may make complete use of the area defined by the first insulating layer, for example, wherein the one or more sections of the resistive layer cover substantially an entire area within the boundaries of the insulating layer. Alternatively, the resistive layer may be selectively patterned to target only selected regions within the boundaries of the insulating layer. In some embodiments, characteristics of the resistive layer such as the size, shape, position, configuration and resistivity may be selected based on predefined functionality requirements for the multifunctional assembly. For example, the resistive layer may be configured for concentrating heat with respect to specific region of the multifunctional assembly (advantageously, e.g., to cure a thick part of a composite cure) or for propagating a signal in a particular direction or manner.

Referring still to FIG. 2, at step 230, a conductive layer is adjacently stacked relative to the resistive layer. As noted above, in some embodiments, materials for the conductive layer may be selected based on chemical compatibility with the resistive layer for example, based on proximity on the galvanic order. In some embodiments the conductive layer may be made of titanium. In exemplary embodiments the conductive layer may be advantageously formed using a direct-write (DW) technique such as plasma flame spray (see U.S. Pat. No. 5,278,442, where a conductive material is electrically liquefied to be placed on a structure) or jetted atomized deposition (See U.S. Pat. No. 7,270,844, where a conductive material is placed on a structure like an ink-jet printer and subsequently hardened). These references are incorporated herein to the extent they are not inconsistent with the present disclosure. DW technology advantageously enables a high level of electro-mechanical integration and may facilitate coupling the conductive material to the resistive layer, particularly, where interconnection problems would otherwise exist (for example, in the absence of a free edge). Modifications to DW techniques are also possible. For example, a silk-screening process may be improved to reduce trace resistance variability and improve measurement accuracy. In some embodiments, a chemical etched template may be used to apply a trace pattern with better precision. In other embodiments, the number of traces (or electrodes) may be increased in order to increase spatial resolution.

As also noted above, one purpose of the conductive layer may be to distribute/receive electrical, acoustic or thermal energy to/from the resistive layer. Thus, in exemplary embodiments, the conductive layer may define, for each contiguous section of the resistive layer, an electrode pair, for example, a pair of elongated electrodes on opposite sides of the resistive layer section (see, e.g., first insulating layer 130, resistive layer 110 and conductive layer 120 of FIG. 4A).

In further exemplary embodiments the conductive layer may define, for each contiguous section of the resistive layer, one or more electrode arrays defining a plurality of electrode pairs across different parts of the section. For example, the electrode pairs may advantageously define a grid across a contiguous section resistive layer (see, e.g., first insulating layer 130, resistive layer 110 and conductive layer 120 of FIG. 4B including a grid of drive electrodes and reference electrodes). Advantageously, the electrode array(s) may be used to detect and characterize (e.g., spatially locate) changes in conductivity/resistivity across the resistive layer. In exemplary embodiments, the electrode pairs may be parallel (e.g., in different planes), parallel in both orthogonal directions, parallel with several traces spaced evenly in one direction, parallel with several traces spaced evenly in one direction on one layer and then spaced in the orthogonal direction on a different layer or the like. In other embodiments, the electrode pairs may include several traces along the perimeter to create several virtual paths, or may be formed as a grid array similar to an LCD screen.

Referring again to FIG. 2, at step 240, conductive elements for breakout points such as an adjacently stacked or integrally formed contact layer may be introduced (integral relative to the conductive layer). In some embodiments, breakout points may be included for each individual electrode defined by the conductive layer. In other embodiments, a plurality of the electrodes may be multiplexed requiring only a single shared breakout point. As noted above, it may be preferable to avoid intersecting conductive elements for the breakout points with the resistive layer. Exemplary conductive elements for breakout points may include, e.g., metal strips, metal disks, metallized vias and the like. In exemplary embodiments, a contact layer is substantially thicker than the conductive layer (for example, at least ten times as thick).

It is noted that in some embodiments, steps 220 through 240 may be reversed with a conductive layer and associated breakout points being stacked before (i.e., underneath) the resistive layer. In yet other embodiments, a conductive layer and associated breakout points may be adjacently stacked relative to each side of the resistance layer, for example, defining a first array of electrodes (e.g., drive electrodes) on a first side of the resistance layer and a second array of electrodes (e.g. reference electrodes) on a second side of the resistance layer.

At step 250, a second insulating layer is added to the stack up and at step 260 the layered structure of the multifunctional assembly is compressed, consolidated or otherwise debulked, for example, using a press or vacuum or other source of pressure. It is noted that in exemplary embodiments, the entire process, or parts thereof, may be repeated to result in a multi-stacked approach. It is further reiterated that, in some embodiments, the order of the layers may be reversed (for example, reversing steps 210 through 250). Thus, in some embodiments a first set of layers may be added to a stack according to the order of steps 210 through 250 and a second set of layers may be added to the stack in a mirror image by reversing steps 210 through 250. It is further reiterated that, in some embodiments, it may be possible to add conductive layers and breakout points above, below, or both above and below a resistive layer.

As noted above, a multifunctional assembly as disclosed herein may form or be incorporated into an object such as a wing of an aircraft, a siding for a building, a casing for a medical device, etc. In some embodiments, integration of the multifunctional assembly as part of an object may include co-curing the multifunctional assembly with the object. Co-curing the multifunctional assembly with the object may include, for example (i) placing the multifunctional assembly onto a surface of a part of an uncured object in a mold to be co-cured, (ii) placing the multifunctional assembly between sub-surface layers of an uncured object in a mold to be co-cured, (iii) placing the multifunctional assembly onto a surface of an already cured part of the object and curing in a secondary process (including, e.g., self-curing or adhesive curing), or (iv) placing the multifunctional assembly between already cured parts of the object and curing in a secondary process (including, e.g., self-curing or adhesive curing). It is noted that, in some embodiments, insulating layer(s) of the multifunctional assembly may serve as an adhesive (e.g., during a curing process) for integrating the multifunctional assembly into an object. In accordance with some embodiments, adhesive layer(s) are provided separate from and in addition to the insulating layer(s) for integrating the multifunctional assembly into an object. In some embodiments, a stackup structure is used to form a desired shape for curing thereof.

As noted above, in exemplary embodiments, breakout points may include inductive charging/receiving elements for enabling contactless driving of electrical energy through a resistive layer of a multifunctional assembly. This may enable contactless generation of heat which may be used in a conductive curing or other heat treatment process such as described herein.

In further exemplary embodiments, a multifunctional assembly may be used to form part of a tool used in a curing or other heat treatment process. For example, the tool may utilize a resistive layer in the multifunctional assembly to generate heat in a controllable and configurable manner so as to enable curing or otherwise heat treating an object using the tool.

Figure 5A:
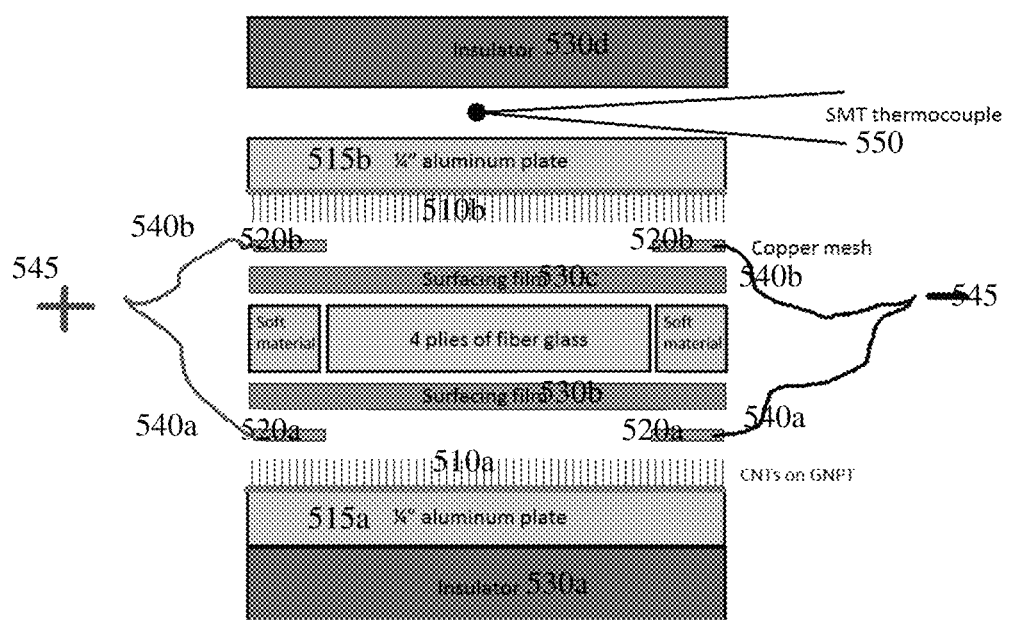
FIG. 5A depicts an exploded schematic view of a first exemplary multifunctional assembly, according to the present disclosure.

With reference now to FIG. 5A, an exploded schematic view of a first exemplary multifunctional assembly 500 is depicted. The multifunctional assembly 500 is characterized by a mirrored stacked arrangement of a layered structure including a first substack 502 and a second substack 504. The first substack 502 includes a first insulating layer 530a, first resistive layer 510a (for example, an aligned CNT network on a guaranteed non-porous Teflon (GNPT)), a first conductive layer 520a (for example, a copper mesh) associated with a first set of breakout points 540a and a second insulating layer (for example, a surfacing film) 530b. The second substack 504 mirrors the first substack 502 and includes a third insulating layer (for example, a surfacing film) 530c a second conductive layer 520b (for example, a copper mesh) associated with a second set of breakout points 540b, a second resistive layer 510b (for example, an aligned CNT network on GNPT) and a fourth insulating layer 530d. In the depicted embodiment 500 first and second aluminum plates 515a and 515b are also included in between the first insulating layer 530a and the first resistive layer 510a and in between the second resistive layer 510b and the fourth insulating layer 530d, respectively. The aluminum plates 515a and 515b may, serve, e.g., as lightning strike protection layers or as structural support layers (such as to increase rigidity or protect the other layers).

It is noted that in the illustrated embodiment, of FIG. 5A the first conductive layer 520a is connected in parallel with the second conductive layer 520b. This advantageously enables driving both the first and second resistive layers 510a and 510b with a same power source. Advantages to including resistive layers in series may include minimizing total power consumption, for example in matching heat flux requirements of an airfoil, or variable thickness part being cured. In alternative embodiments, it may be advantageous to connect the conductive layers in series. Advantageously, by connecting respective conductive layers in parallel or in series a number of breakout points may be reduced.

Figure 5B:
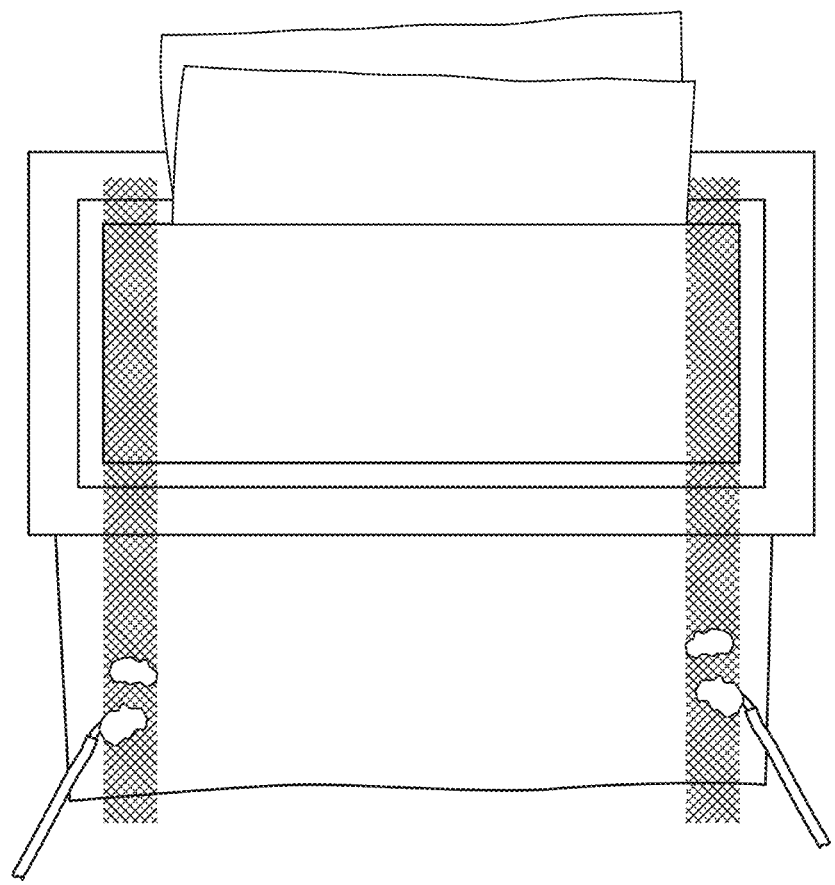
FIG. 5B depicts a photograph of the first exemplary multifunctional assembly of FIG. 5A.

In some embodiments, one or more additional sensors maybe embedded in a multifunctional assembly as taught herein. For example, multifunctional assembly 500 may include a thermocouple 550 (surface mount thermocouple) in between the second aluminum plate 515b and the fourth insulating layer 530d. Advantageously the thermocouple 550 may allow for temperature feedback. It is also noted that, as depicted, the mirrored portions 502 and 504 of the stacked layered structure are separated by a layer 560 of fiber glass 562 and a material having a different hardness than the fiber glass 564 in between the second and third insulating layers 530b and 530c. Furthermore, a voltage source 545 can be coupled to the assembly 500 via the first and second sets of breakout points 540a and 540b. A photograph of the first exemplary multifunctional assembly 500 of FIG. 5A is depicted in FIG. 5B.

Figure 6A:
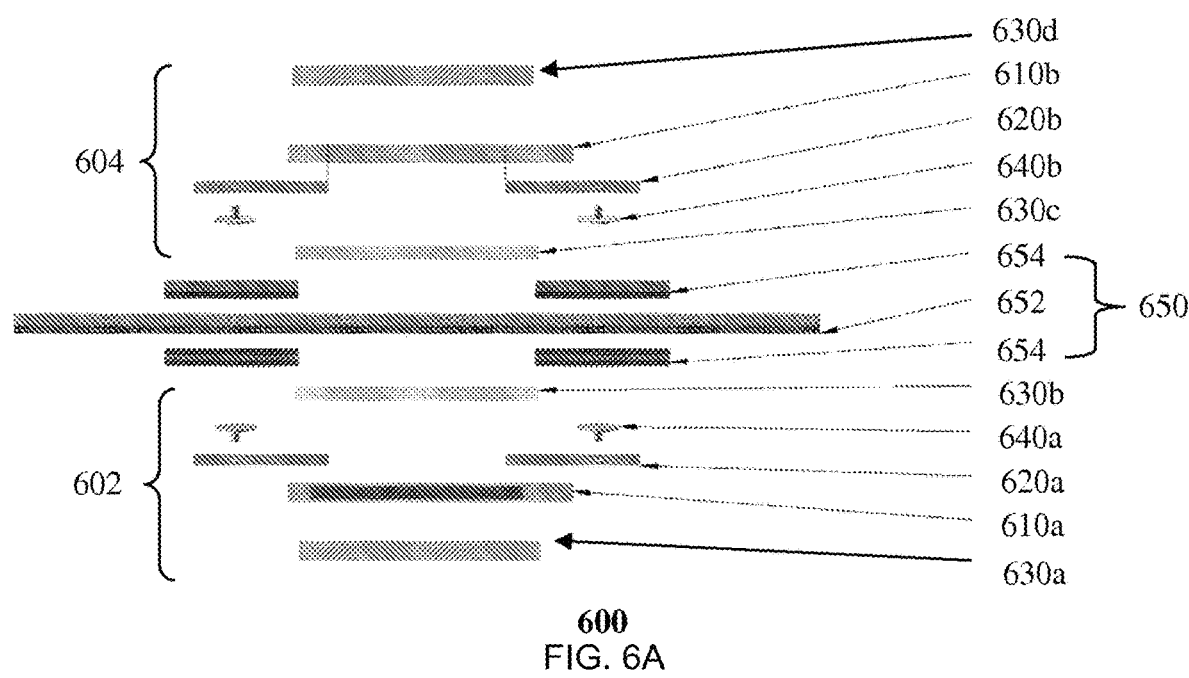
FIG. 6A depicts an exploded schematic view of a second exemplary multifunctional assembly, according to the present disclosure.
Figure 6B:
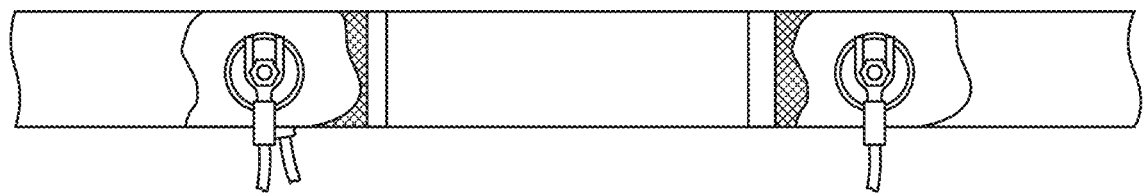
FIG. 6B depicts a photograph of the second exemplary multifunctional assembly of FIG. 5A.

With reference now to FIG. 6A, an exploded schematic view of a second exemplary multifunctional assembly 600 is depicted. The multifunctional assembly 600 includes a mirrored stacked arrangement of a layered structure including a substack 602 and a second substack 604. The first substack 602 includes a first insulating layer 630a (for example, a surface film) a first resistive layer 610a (for example, an aligned CNT network on GNPT) a first conductive layer 620a (for example, a copper foil) associated with a first set of breakout points (for example, click bond studs) 640a and a second insulating layer (for example, a surfacing film) 630b. The second substack 604 mirrors the first substack 602 and includes, a third insulating layer 630c (for example, a surfacing film) a second conductive layer 620b (for example, a copper foil) associated with a second set of breakout points 640b, a second resistive layer 610b (for example, an aligned CNT network on GNPT) and a fourth insulating layer 630d (for example, a surfacing film). In the depicted embodiment 600, mirrored portions 602 and 604 of the stacked layered structure are further separated by a middle layer 650 of a carbon fiber reinforced polymer (CFRP) laminate 652 with polyimide tape 654 on each side thereof. Notably, the first and second conductive layers 620a and 620b in the multifunctional assembly 600 of FIG. 6 are electrically isolated (as compared to the parallel connectivity of the conductive layers 520a and 520b in the multifunctional assembly 500 of FIG. 5). This may advantageously enable utilizing the first and second resistive layers 610a and 610b independent of one another, such as for different functions/operations or for providing increased control over warming temperatures to, for example, maintain uniformity of warming during thermoset curing. A photograph of the second exemplary multifunctional assembly 600 of FIG. 6A is depicted in FIG. 6B.

Figure 7A:
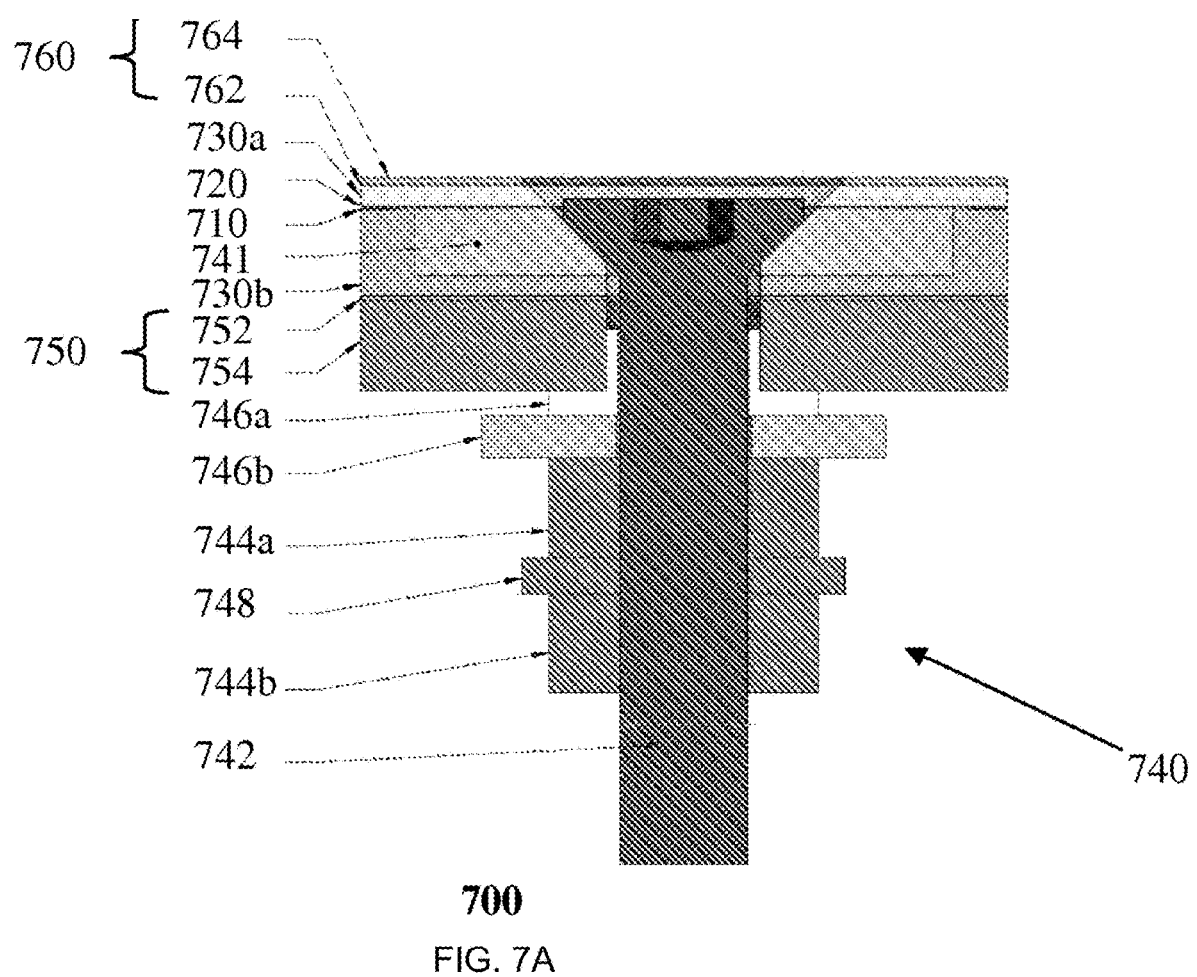
FIG. 7A depicts an exploded schematic view of a third exemplary multifunctional assembly, according to the present disclosure.

With reference now to FIG. 7A, an exploded schematic view of a third exemplary multifunctional assembly 700 is depicted. The multifunctional assembly 700 includes a layered structure having a first insulating layer 730a (for example, an adhesive epoxy), a conductive layer (for example, a titanium electrode mesh) 720 and associated breakout point 740, a resistive layer (for example, a CNT network) 710 and a second insulating layer 730b (for example, an adhesive epoxy). In some embodiments, titanium materials are used to promote compatibility with the CNT network from a galvanic chemistry view. In multifunctional assembly 700 the layered structure also includes additional layers 750 for providing additional structural properties (for example, structural layers of glass fiber reinforced polymer (GFRP) 752 and carbon fiber reinforced polymer (CFRP) 754). The multifunctional assembly 700 also includes additional lightning strike protection layers 760 for providing lightning strike protection properties (for example, a copper mesh 762 below a surface film 764).

Figure 7B:
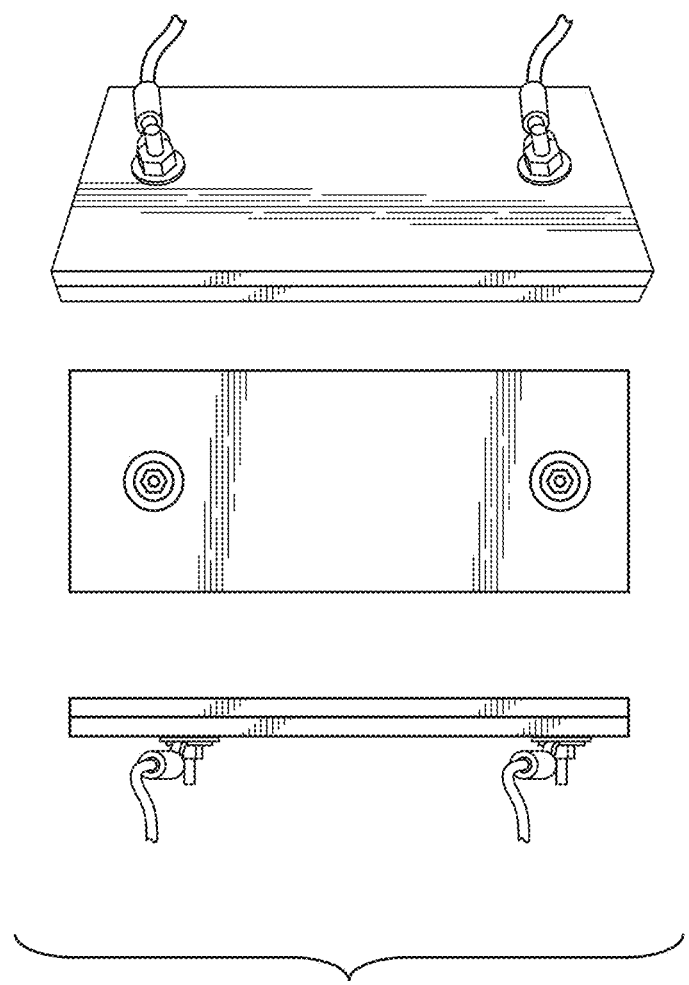
FIG. 7B depicts photographs of the third exemplary multifunctional assembly of FIG. 5A.

The multifunctional assembly 700 of FIG. 7A illustrates an exemplary structure for breakout point 740, including a recessed tubular member 742 (for example a titanium stud or screw) electrically coupled to a contact layer 741 (for example, a titanium disk) and extending through an aperture in the additional layers 750. The breakout point 740 further includes electrical isolator 746a (for example, an electrically inert shoulder washer) for isolating the inset tubular member 742 from the structural layers 750. The inset tubular member 742 may be threaded or smooth. If threaded a ring terminal 748 (for example for a power source or sensor instrument) may be secured thereto via a washer 746 and one or more nuts 744a and 744b. Photographs of the third exemplary multifunctional assembly 700 of FIG. 7A is depicted in FIG. 7B.

As depicted in the exemplary assemblies of FIGS. 5A-7A, various configurations may be utilized for implementing a breakout point. In exemplary embodiments, a breakout point may include a contact member (such as a screw, stud or other tubular member) operatively associated with the a conductive layer and extending out from a surface of the multifunctional assembly. The conductive member may then be connected to a wire or other external conductor or wire harness. In further exemplar embodiments, a breakout point may include a contact layer such as a disk or other conductive element integrated into the multifunctional assembly. In exemplary embodiments the contact layer may be used with or without an associated contact member (such as a screw, stud or other tubular member). For example, when used without a contact member, a countersunk aperture may be used to make electrical contact with the contact layer while isolating it from other layers (e.g., using spacers, shoulder washers and liquid epoxy or other strategies). In some embodiments a contact layer may be integrally formed with conductive layer.

As noted above, the multifunctional assemblies disclosed herein enable various functions/operations for objects manufactured from or otherwise incorporating a multifunctional assembly, as taught herein.

For example, in some embodiments, an exemplary multifunctional assembly may enable an ice protection system (IPS) which may provide anti-icing (e.g., preventing the formation of ice by maintaining a specified temperature distribution), de-icing (e.g., melting ice by maintaining a specified temperature distribution) or ice detection (e.g., measuring thermal heat capacity to quantify thickness of ice through 1D thermodynamics). An ice protection system or other heat generation system may be implemented by electrically coupling a constant or variable voltage or current source across a pair of electrodes defined by the conductive layer. In some embodiments, stepped resistance may be used to produce a varying thermal field thereby improving efficiency (e.g., improved electrical efficiency such as based on the amount of heat required for deicing giving environmental factors or based on more heat being required to deice versus preventing ice from forming). In exemplary embodiments one or more temperature sensors (e.g., thermocouples) may be used to provide a feedback loop for a heating process.

In further embodiments, an exemplary multifunctional assembly may enable structural health monitoring (SHM), which may provide damage detection (e.g., measuring/locating/quantifying permanent or temporary changes in resistance in the resistive layer due to residual damage such as by applying a current and measuring a voltage or vice versa), strain monitoring (e.g., measuring/locating/quantifying temporary changes in resistance in the resistive layer due to stretch or compression quasi-statically such as by applying a current and measuring a voltage or vice versa or acoustic detection, (e.g., measuring/locating/quantifying an impact event based on acoustic propagation across the resistive layer). It is noted that different health monitoring techniques may advantageously be used in conjunction with each other, e.g., by varying collection rate, and can be separated through filtering. Health monitoring techniques may further compensate for (e.g., via normalization) strain induced by mechanical load, humidity or temperature.

In further embodiments, an exemplary multifunctional assembly may enable out of oven conductive curing. This may include, e.g., (i) curing of an uncured composite part by applying the multifunctional assembly on one or both of the free surfaces to control curing temperature, (ii) curing of an uncured composite part by applying the multifunctional assembly within one or more of the composite parts layers to control curing temperature, (iii) curing of a secondary metallic or composite structure (ribs or cores for example) to an already cured part using the multifunctional assembly to provide temperature control (iv) curing of secondary metallic or composite structure (ribs or cores for example) to an already cured part using the multifunctional assembly to provide temperature control and adhesion and (iv) using the multifunctional assembly for cure monitoring, e.g., by monitoring temperature via a thermocouple or other temperature sensor incorporated in the multifunctional assembly or by mapping the epoxy viscosity and thus state of cure to the change in resistive layer resistivity, and using this slope to control the cure temperature in a feedback loop.

In exemplary embodiments, an exemplary multifunctional assembly of the present disclosure may be associated with a detection system configured or programmed to detect a change in a physical property or characteristic of an object manufactured from or otherwise incorporating the multifunctional assembly. In some embodiments the change in the physical property or characteristic of the object may be determined by detecting a change in electrical conductivity/resistivity across the resistive layer, e.g., across a CNT network, such as defined by one or more electrode pairs in the conductive layer. In exemplary embodiments, the changes in conductivity/resistivity may be on account of changes in the CNT network structure (for example, due to damage to the object) or on account of a piezoresistive response of the CNT network structure (for example, due to propagation of a mechanical wave, a change of shape of the object, or structural damage to the object). In some embodiments, the detection system is configured or programmed to detect a state change of a substance (for example, ice) on a surface of the object based on changes in surface conductivity or resistance.

In exemplary embodiments the physical property or characteristic of the object may be related to the structural health of the object. Thus, for example, damage to the object may be detected based on a detected change in conductivity/resistivity. Using a plurality of electrode pairs, for example, an electrode grid as described above, spatial data for the damage may also be determined, for example relating to one or more of location(s), size, shape and distribution of the damage.

In other exemplary embodiments, the physical property or characteristic of the object may be related to the shape of the object. Thus, for example, a change to the shape of the object may be detected based on a detected change in conductivity/resistivity. More particularly, a change in shape of the object can cause a piezoresistive response which results in the change in conductivity/resistivity. This may be particularly useful for applications where the shape of the object is configurable. In particular, the detection system may provide useful feedback, to facilitate configuring the shape of the object.

In exemplary embodiments, changes in electrical conductivity/resistivity of the resistive layer may also be used to detect and monitor, for example, based on a piezoresistive response, the propagation of a mechanical wave, for example an acoustic wave, through/across the object. Thus, the detection system may be configured to detect an impact to the object based on detection of a mechanical wave produced by the impact. Using a plurality of electrode pairs, spatial data for the impact may also be determined, for example relating to one or more of location, size, shape and distribution of the impact. In other embodiments, a mechanical wave may be generated and monitored in order to detect damage to the object, based on the propagation pattern of the wave. In exemplary embodiments the detection system may include a plurality of acoustic sensors, coupled, at various points, to the resistive layer. The plurality of acoustic sensors may be used to detect a propagating acoustic signal and determine its origin based on sensor timing. In exemplary embodiments, an acoustic wave may also be monitored using the resistive layer as an acoustic-electric transducer. The electrical signal equivalent of the wave signal may advantageously be isolated in the frequency domain. An array of detectors may be used to track the spatial propagation of the signal. Acoustic wave applications are addressed in greater detail in sections which follow.

As described herein a printed circuit board (PCB) may be configured to couple, e.g., with the conductive layer of the multifunctional assembly. The PCB may advantageously include multiplexing switches, e.g., for multiplexing a plurality of channels (trace electrode pairs). The PCB may further be configured to couple with data acquisition hardware, a processor or computing environment. In exemplary embodiments, data may also be collected by hand, for example using a multimeter that can connect to the PCB as well. The data may then be transferred, for example to a processor or other computing environment for further processing. In other embodiments hardware, firmware or software may be implemented to automate the testing process (for example, automate selection and cycling of channels or data acquisition). In exemplary embodiments, automating hardware may connect directly, for example, via a mating surface mount technology (SMT) header connector, and to a PC, for example, via a RS-232 connection. Dual multiplexer banks may be implemented to select an appropriate trace pair for measurement. A constant current may then be applied through the trace pair and voltage (for example, 16-bit voltage) measured. Conductivity/resistivity may then be derived (note that resistance is directly related to voltage over current). The forgoing technique allows fast measurement across traces defined by the conductive layer.

Acoustic Wave Detection:

In exemplary embodiments, the resistive layer may be used to detect acoustic wave propagation in an object. In particular, a detection system including a plurality of microphones, accelerometers, or other acoustic sensors coupled via the conductive layer at various points to the resistive layer may be used to detect or "listen" for waves, e.g., high frequency stress waves (e.g., 30-300 kHz) reverberating in the structure, for example, radiating from an impact point. Using the time synchronized results from multiple sensors the generation point of the waves may be triangulated, for example in order to determine the impact point.

As noted above, acoustic wave detection may also be used as a possible solution for structural health monitoring, for example by exploiting the piezoresistive property of CNT network based resistive layers (or other resistive properties having piezoresistive properties). For example, as CNT fibers are strained by a stress wave, such as an acoustic wave, they are dynamically resistive proportional to stress. Therefore, the response of a CNT network to an impact event can be captured through detection of a plurality of local CNT piezoresistive responses captured over a plurality of electrode pairs. The plurality of local CNT responses enables full-field visualization of the waves as they propagate from the point source. This may facilitate detection and locating of damage. In addition, since this technique uses high frequency data (e.g., >30 kHz), it can be much less susceptible to static, structural dynamic operating or acoustic loads, the effects of which can be filtered out in the frequency domain.

It will be apparent in view of this disclosure that objects configured for acoustic wave detection can implement the acoustic wave detection alone or in any combination of primary and/or secondary functions of the object. For example, in some embodiments, the object can serve a primary function of providing a structure having a prescribed structural capability, a secondary function of using acoustic wave detection to "listen" for waves radiating from an impact point, and another secondary function of using acoustic wave detection for structural health monitoring. In some other embodiments, for example, the primary functions of the object can be using acoustic wave detection to "listen" for waves radiating from an impact point and using acoustic wave detection for structural health monitoring while the secondary function is providing structural support to a structure.

Guided-Wave Detection

Relying on the piezoresistive property of a CNT network, Guided-Wave (GW) detection approaches may also be used. For example, a surface-bonded piezoelectric actuator may be used for high frequency GW excitation of an object. The response of the CNT network may then be captured (again advantageously using a higher frequency acquisition system). This approach may enable full-field visualization of a GW scatter field as it propagates.

It will be apparent in view of this disclosure that objects configured for guided wave detection can implement the guided wave detection alone or in any combination of primary and/or secondary functions of the object. For example, in some embodiments, the object can serve a primary function of providing a structure having a prescribed structural capability and a secondary function of using guided wave detection to provide full-field visualization of a GW scatter field as it propagates. In some other embodiments, for example, the primary function of the object can be using guided wave detection to provide full-field visualization of a GW scatter field as it propagates while the secondary function is providing structural support to a structure.

Additional Applications.

In exemplary embodiments, an object at least a portion of which is formed from or includes a multifunctional assembly, as taught herein, may be used/configured as an antenna, for example, for receiving, transmitting, absorbing or dissipating electromagnetic radiation, acoustic radiation or electrical discharge. Advantageously, the resistive layer may be selectively structured so as to optimize the structure, conductivity or other characteristic or property of the antenna for a given application or purpose. In exemplary embodiments, the electromagnetic radiation may be a radio signal or radar signal, for example, wherein the resistive layer is selectively patterned for radio detection/transmission or radar detection/dispersion. In other exemplary embodiments, the acoustic radiation may form sound propagation, such as sonar, for example, wherein the resistive layer is selectively patterned for sonar detection. In yet other exemplary embodiments the electrical discharge or energy transfer may be a high power discharge, such as lightning, for example, wherein the resistive layer is selectively patterned for lightning dissipation.

It will be apparent in view of this disclosure that objects configured for antenna function can implement the antenna function alone or in any combination of primary and/or secondary functions of the object. For example, in some embodiments, the object can serve a primary function of providing a structure having a prescribed structural capability and secondary functions of using the antenna to receive, transmit, absorb, or dissipate electromagnetic radiation, acoustic radiation, or electrical discharge. In some other embodiments, for example, the primary functions of the object can be using the antenna to receive, transmit, absorb, or dissipate electromagnetic radiation, acoustic radiation, or electrical discharge while the secondary function is providing structural support to a structure.

In some embodiments an object at least a portion of which is formed from or includes a multifunctional assembly, as taught herein, may be used/configured as a conduit for conveying thermal or electrical energy, for example between a plurality of components coupled to the object. In exemplary embodiments, the resistive layer may be configured to provide power transfer from one component (for example, from a solar power source) to another component. In other exemplary embodiments, the resistive layer may be configured provide a communication pathway between components. In exemplary embodiments, based on the high thermal conductivity of a CNT network, the object may be used as a heat sink or radiator panel. In other embodiments the object may be used as a heat shield or other thermal protecting device.

It will be apparent in view of this disclosure that objects configured for conveying or insulating thermal or electrical energy can implement the thermal or electrical energy conveyance/insulation functionality alone or in any combination of primary and/or secondary functions of the object. For example, in some embodiments, the object can serve a primary function of providing a structure having a prescribed structural capability and a secondary functions of providing a communication pathway between components and a heat shield. In some other embodiments, for example, the primary functions of the object can be providing a communication pathway between components and a heat shield while the secondary function is providing structural support to a structure.

Machine Embodiments

It is contemplated that detection and control systems presented may be implemented, in part, e.g., via one or more programmable processing units having associated therewith executable instructions held on one or more non-transitory computer readable medium, RAM, ROM, harddrive, or hardware. In exemplary embodiments, the hardware, firmware or executable code may be provided, e.g., as upgrade module(s) for use in conjunction with existing infrastructure (e.g., existing devices/processing units). Hardware may, e.g., include components or logic circuitry for executing the embodiments taught herein as a computing process.

Displays or other feedback means may also be included to convey detected/processed data. Thus, in exemplary embodiments, structural health information, shape information, acoustic wave propagation, thermal information, etc. may be displayed, e.g., on a monitor. The display or other feedback means may be stand-alone or may be included as one or more components/modules of the processing unit(s). In exemplary embodiments, the display or other feedback means may be used to visualize structural damage to an object.

The software code or control hardware which may be used to implement some of the present embodiments is not intended to limit the scope of such embodiments. For example, certain aspects of the embodiments described herein may be implemented in code using any suitable programming language type such as, for example, C or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and receive data over a network having a central processing unit (CPU). Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), etc.

Figure 8:
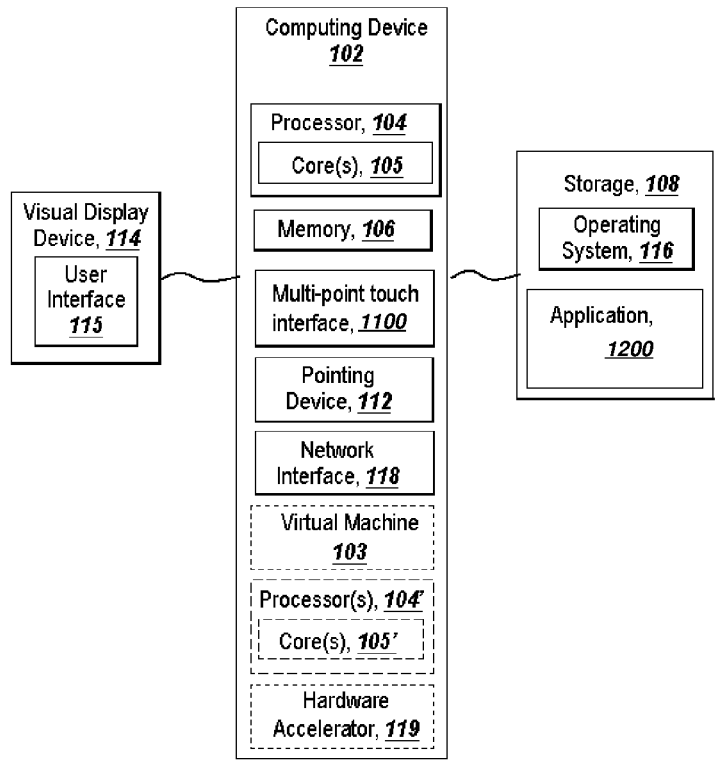
FIG. 8 depicts an exemplary computing environment suitable for practicing exemplary embodiments described herein.

Referring now to FIG. 8, an exemplary computing environment suitable for practicing exemplary embodiments is depicted. The environment may include a computing device 102 which includes one or more non-transitory media for storing one or more computer-executable instructions or code for implementing exemplary embodiments. For example, memory 106 included in the computing device 102 may store computer-executable instructions or software, e.g. instructions for implementing and processing an application 1200. For example, execution of application 1200 by processor 104 may facilitate detection of electrical conductivity across a resistive layer.

The computing device 102 also includes processor 104, and, one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 1200 and other software in storage 108. A virtual machine 103 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, etc. The memory 106 may comprise other types of memory as well, or combinations thereof. A user may interact with the computing device 102 through a visual display device 114, such as a computer monitor, which may display one or more user interfaces 115. The visual display device 114 may also display other aspects or elements of exemplary embodiments. The computing device 102 may include other I/O devices such as a keyboard or a multi-point touch interface 1100 and a pointing device 112, for example a mouse, for receiving input from a user. A keyboard and the pointing device 112 may be connected to the visual display device 114. The computing device 102 may include other suitable conventional I/O peripherals. The computing device 102 may further comprise a storage device 108, such as a hard-drive, CD-ROM, or other storage medium for storing an operating system 116 and other programs, e.g., application 1200 characterized by computer executable instructions for implementing the detection and control systems described herein.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 9:
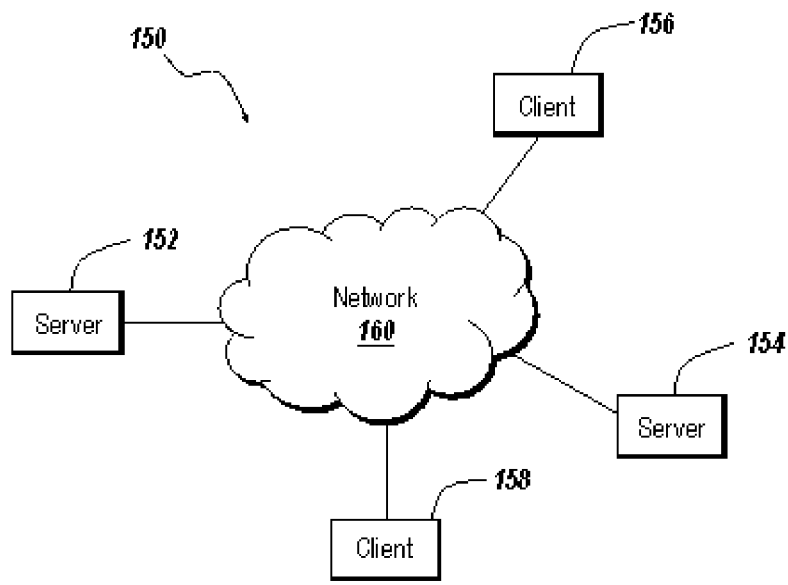
FIG. 9 depicts an exemplary network environment suitable for a distributed implementation of exemplary embodiments described herein.

FIG. 9 illustrates an exemplary network environment 150 suitable for a distributed implementation of exemplary embodiments. The network environment 150 may include one or more servers 152 and 154 coupled to clients 156 and 158 via a communication network 160. In one implementation, the servers 152 and 154 or the clients 156 or 158 may be implemented via the computing device 102. The network interface 118 of the computing device 102 enables the servers 152 and 154 to communicate with the clients 156 and 158 through the communication network 160. The communication network 160 may include Internet, intranet, LAN (Local Area Network), WAN (Wide Area Network), MAN (Metropolitan Area Network), wireless network (e.g., using IEEE 802.11 or Bluetooth), etc. In addition the network may use middleware, such as CORBA (Common Object Request Broker Architecture) or DCOM (Distributed Component Object Model) to allow a computing device on the network 160 to communicate directly with another computing device that is connected to the network 160.

In the network environment 160, the servers 152 and 154 may provide the clients 156 and 158 with software components or products under a particular condition, such as a license agreement. The software components or products may include one or more components of the application 1200. For example, the client 156 may detect electrical conductivity data which is subsequently communicated over the server 152 for processing.

Although the teachings herein have been described with reference to exemplary embodiments and implementations thereof, the disclosed systems are not limited to such exemplary embodiments/implementations. Rather, as will be readily apparent to persons skilled in the art from the description taught herein, the disclosed systems are susceptible to modifications, alterations and enhancements without departing from the spirit or scope hereof. Accordingly, all such modifications, alterations and enhancements within the scope hereof are encompassed herein.

What is claimed:
1. A system comprising:
an object formed incorporating a multifunctional assembly having a stacked, layered structure, the multifunctional assembly including:
a first resistive layer,
a first conductive layer electrically coupled to and stacked on the first resistive layer to distribute an electrical current through the first resistive layer, and a first pair of insulating layers including a first insulating layer stacked on and disposed across the first resistive layer and a second insulating layer stacked on and disposed across the first conductive layer on a side opposing the first resistive layer; and a control system including a processor and LCR (inductance, capacitance, resistance) circuitry couplable to the first resistive layer via the conductive layer and configured or programmed to directly or indirectly measure or detect a change in a structural configuration, structural integrity or structural health characteristic of the object, wherein the change in the structural configuration, structural integrity or structural health characteristic of the object is indicated by a change in electrical conductivity or resistance across the first resistive layer.

2. The system of claim 1, wherein the change in the structural integrity or structural health characteristic of the object is indicative of damage to the object.

3. The system of claim 1, wherein the change in the structural configuration, of the object is related to a shape of the object.

4. The system of claim 1, wherein the change in the structural integrity or structural health characteristic of the object includes a response to an acoustic wave.

5. The system of claim 1, wherein the control system is further configured to measure or detect an impact to the object based on propagation of an acoustic wave across the object.

6. The system of claim 1, wherein the change in the structural configuration, structural integrity or structural health characteristic includes spatial data relating to the change in the structural configuration, structural integrity or structural health characteristic of the object.

7. The system of claim 6, wherein the spatial data includes one or more of location, size, shape or distribution of the change in the structural configuration, structural integrity or structural health characteristic.

8. The system of claim 1,
wherein a shape of the object is configurable, and
wherein the control system provides feedback on the shape of the object.

9. The system of claim 1, wherein the first resistive layer includes a carbon nanotube (CNT) network.

10. The system of claim 1, further comprising a first plurality of electrical breakout points to couple the first conductive layer to an environment exterior to the first and second insulating layers.

11. The system of claim 10, wherein the first plurality of electrical breakout points includes contactless coupling elements, and the contactless coupling elements include inductive charging or receiving elements.

12. The system of claim 10, wherein the inductive charging or receiving elements include RFID.

13. The system of claim 10, wherein the first plurality of electrical breakout points extend through the second insulating layer to an environment exterior to the multifunctional assembly.

14. The system of claim 1, further comprising an aperture extending through the second insulating layer to the conductive layer to provide electrical connectivity thereto.

* * * * *